(12) United States Patent
Ogata et al.

(10) Patent No.: US 10,867,403 B2
(45) Date of Patent: Dec. 15, 2020

(54) VEHICLE EXTERNAL RECOGNITION APPARATUS

(71) Applicant: CLARION CO., LTD., Saitama (JP)

(72) Inventors: Takehito Ogata, Tokyo (JP); Daisuke Fukuda, Saitama (JP); Masahiro Kiyohara, Saitama (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 16/628,271

(22) PCT Filed: Jun. 25, 2018

(86) PCT No.: PCT/JP2018/023924
§ 371 (c)(1),
(2) Date: Jan. 3, 2020

(87) PCT Pub. No.: WO2019/009110
PCT Pub. Date: Jan. 10, 2019

(65) Prior Publication Data
US 2020/0219281 A1 Jul. 9, 2020

(30) Foreign Application Priority Data
Jul. 5, 2017 (JP) ................................. 2017-132292

(51) Int. Cl.
*G06T 7/73* (2017.01)
*G08G 1/16* (2006.01)
*G06T 7/215* (2017.01)

(52) U.S. Cl.
CPC ............ *G06T 7/73* (2017.01); *G06T 7/215* (2017.01); *G08G 1/16* (2013.01)

(58) Field of Classification Search
CPC .............. G06T 7/73; G06T 7/215; G08G 1/16
See application file for complete search history.

(56) References Cited

U.S. PATENT DOCUMENTS

2010/0098297 A1\* 4/2010 Zhang ................... G06K 9/4652
382/104
2012/0213412 A1\* 8/2012 Murashita ................ G06T 7/50
382/104

FOREIGN PATENT DOCUMENTS

JP 2008262333 A 10/2008
JP 2013030183 A 2/2013
(Continued)

OTHER PUBLICATIONS

International Search Report from International Application No. PCT/JP2018/023924 dated Sep. 25, 2018.
(Continued)

*Primary Examiner* — Francis Geroleo
(74) *Attorney, Agent, or Firm* — Brundidge & Stanger, P.C.

(57) ABSTRACT

A vehicle external recognition extracts a feature point from an image including an environment around a vehicle; measures a distance from the vehicle to the feature point based on a movement of the feature point; extracts, as a first road surface area, a local area judged as a road surface based on distance information to the feature point and a position of the feature point in the image from among a plurality of local areas in the image; calculates a multi-dimensional image feature amount including color information for each of the plurality of local areas, and similarity to the first road surface area using the image feature amount with respect to a no-road-surface-extracted area(s) from among the plurality of local areas; extracts a second road surface area from the no-road-surface-extracted area(s) based on the similarity; and recognizes a travelable area using the first and the second road surface areas.

9 Claims, 20 Drawing Sheets

(56) References Cited

FOREIGN PATENT DOCUMENTS

| JP | 2015210661 A | 11/2015 |
| WO | 2015163028 A1 | 10/2015 |

OTHER PUBLICATIONS

Ayumu Nagai, et al "Obstacle Detection from Monocular On-Vehicle Camera in Units of Delaunay Triangles", IPSJ SIG Technical Report, vol. 2013-AL-143 No. 13, Apr. 2013, pp. 1-8.

Office Action from JP Application No. 2017-132292 dated Jun. 9, 2020, 6 pages.

* cited by examiner

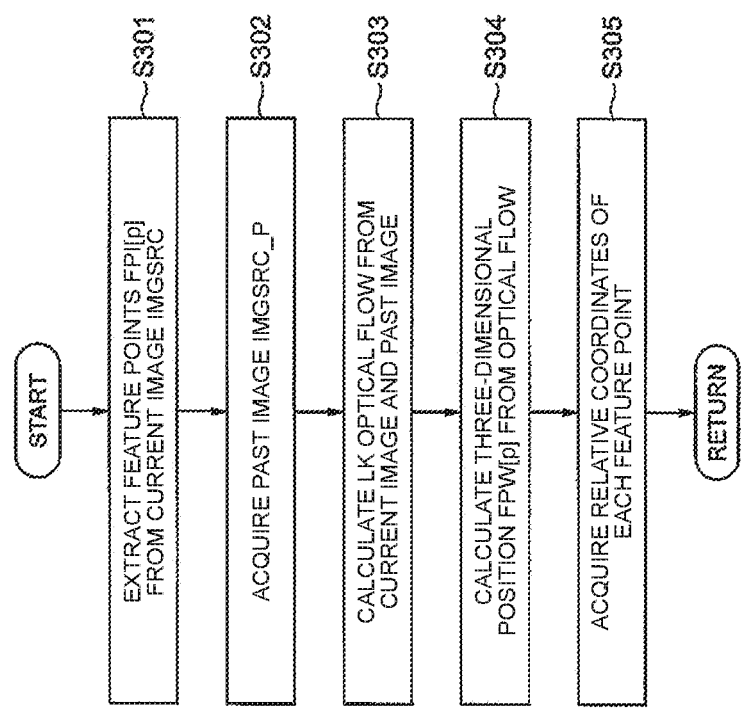

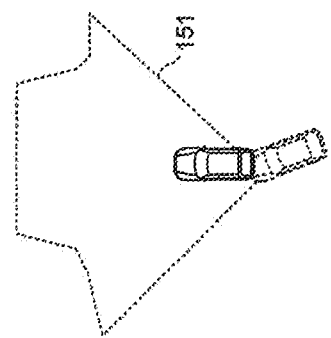
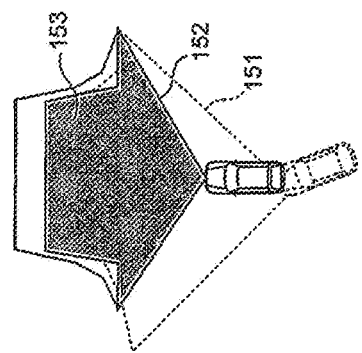
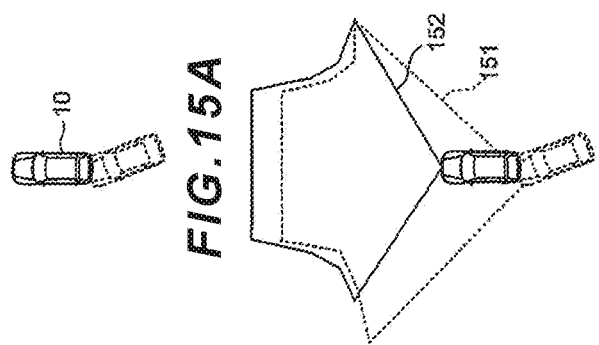

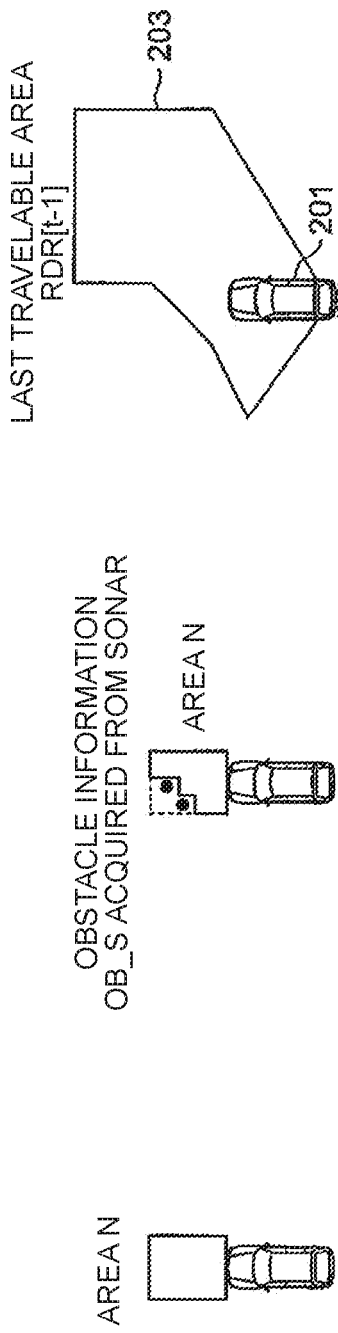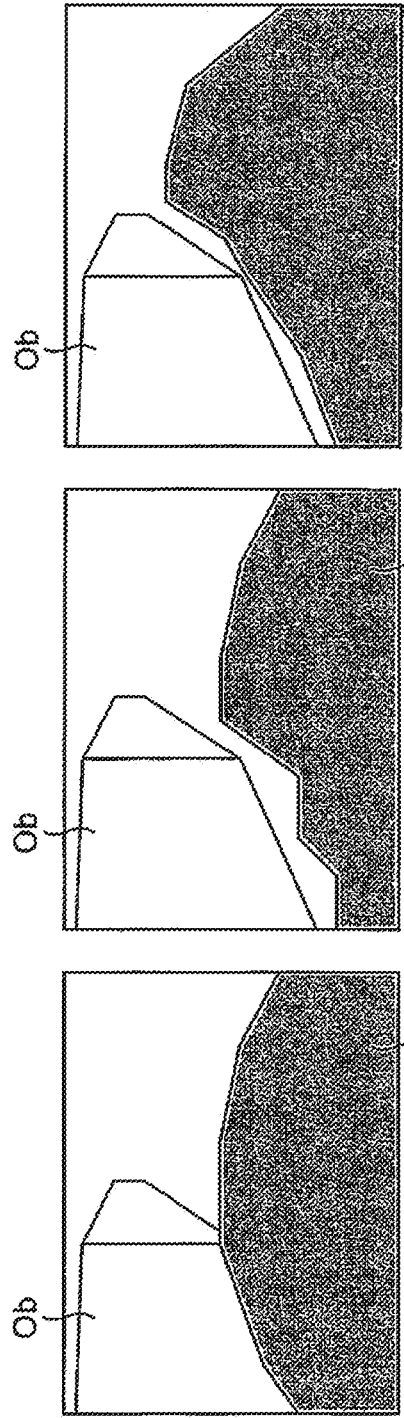

VEHICLE EXTERNAL RECOGNITION APPARATUS

TECHNICAL FIELD

The present invention relates to a vehicle external recognition apparatus that recognizes a travelable area around a driver's own vehicle on the basis of information from an image sensor(s) of a camera(s) or the like.

BACKGROUND ART

In recent years, the development of a system for recognizing an external environment around a driver's own vehicle by using a camera(s) and supporting the driver's driving operations has been being promoted. For example, an autonomous parking system which detects parking spaces around the driver's own vehicle and automatically performs some or all of the driver's parking operations has been put to practical use.

If a travelable area around the driver's own vehicle can be recognized after detecting the parking spaces by using the camera(s), it becomes possible to generate an optimum parking route depending on the travelable area and park the vehicle in the shortest time. As a means for detecting the travelable area, for example, PTL 1 describes a method for detecting feature points from an image and estimating a road surface area by using three-dimensional information measured from the feature points in divided areas by using a means of measuring the three-dimensional information from time-series movements of the feature points and a means of dividing the image area. Also, PTL 2 describes a method for: extracting a strong edge area(s) from an image and estimating whether the area is a road surface or an obstacle by using edge information; and, further regarding an area(s) other than the strong edge area(s), extracting a weak edge(s) and gradation and estimating whether the area is a road surface or an obstacle by using its time changes.

CITATION LIST

Patent Literature

PTL 1: Japanese Patent Application Laid-Open (Kokai) Publication No. 2013-30183
PTL 2: Japanese Patent Application Laid-Open (Kokai) Publication No. 2008-262333

SUMMARY OF THE INVENTION

Problems to be Solved by the Invention

However, the feature points for measuring the three-dimensional information tend to appear in the strong edge areas, but hardly appear in the weak edge areas such as particularly a road surface area far from the driver's own vehicle where it is difficult to measure the three-dimensional information. Furthermore, when the time changes are observed by extracting the weak edges and the gradation, it is similarly difficult to observe the edges in the road surface area far from the driver's own vehicle.

The present invention was devised in light of the above-described circumstances and it is an object of the invention to provide a vehicle external recognition apparatus capable of extracting a road surface area which is far from the driver's own vehicle and regarding which edge observation is difficult, by using camera images.

Means to Solve the Problems

An on-vehicle external recognition apparatus according to the present invention to solve the above-described problem is an on-vehicle external recognition apparatus for recognizing a travelable area around a driver's own vehicle, wherein the on-vehicle external recognition apparatus includes: an image acquisition unit that acquires an image including an environment around the driver's own vehicle; a feature point distance measurement unit that extracts a feature point from the image and measures a distance from the driver's own vehicle to the feature point on the basis of a movement of the feature point in the image as obtained by time-series tracking of the feature point; a first road surface area extraction unit that extracts, as a first road surface area, a local area which is judged as a road surface on the basis of distance information to the feature point and a position of the feature point in the image from among a plurality of local areas which are set in the image; an image feature amount calculation unit that calculates a multi-dimensional image feature amount including color information for each of the plurality of local areas in the image; a second road surface area extraction unit that calculates similarity to the first road surface area by using the image feature amount with respect to at least one or more no-road-surface-extracted areas, which have not been extracted as the first road surface area by the first road surface area extraction unit, from among the plurality of local areas in the image and extracts a second road surface area from the at least one or more no-road-surface-extracted areas on the basis of the calculated similarity; and a travelable area recognition unit that recognizes the travelable area by using the first road surface area and the second road surface area.

Advantageous Effects of the Invention

According to the present invention, the distance from the driver's own vehicle to the feature point is firstly measured by using time-series changes of the feature point; and the measured distance to the feature point is used to extract the first road surface area from the local areas in the image on the basis of the image position of the feature point. Furthermore, the multi-dimensional image feature amount including the color information is calculated for each local area in the image; and the similarity to the road surface area is calculated by using the image feature amount with respect to the no-road-surface-extracted area(s), which has not been extracted as the first road surface area by the first road surface area extraction unit, from among the local areas; and if the relevant area is similar to the road surface area, it is extracted as the road surface area. Therefore, if the road surface area has been successfully extracted by using the measurement result based on the feature point in the vicinity of the driver's own vehicle, an area with a color feature similar to that of the extracted road surface area can be extracted as the road surface area; and a road surface area which is far from the driver's own vehicle and regarding which edge observation is difficult can be extracted as the road surface area.

Further features relating to the present invention will become apparent from the statement of this description and the attached drawings. Furthermore, problems, configura-

BRIEF DESCRIPTION OF DRAWINGS

FIG. 3 is a flowchart illustrating processing by a feature point distance measurement unit according to the first embodiment of the present invention;

FIG. 15 is an explanatory diagram of time series processing by the travelable area recognition unit according to the first embodiment of the present invention;

FIG. 20 is an explanatory diagram of processing by the third road surface area extraction unit according to the second embodiment of the present invention.

DESCRIPTION OF EMBODIMENTS

First Embodiment

Figure 1:
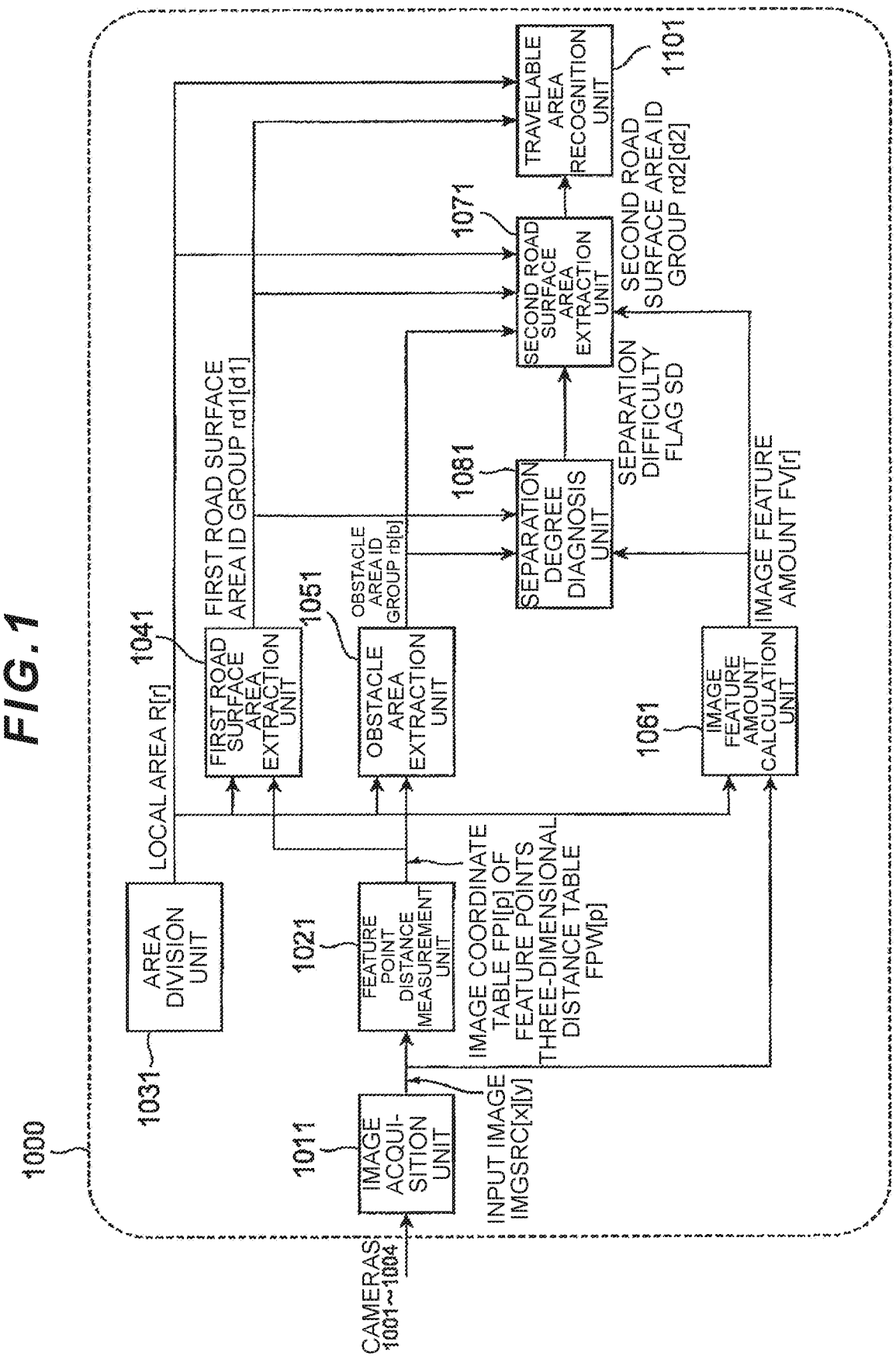
FIG. 1 is a block diagram of a vehicle external recognition apparatus according to a first embodiment of the present invention.

A first embodiment of the present invention will be explained below in detail with reference to the drawings. FIG. 1 is a block diagram of an on-vehicle external recognition apparatus 1000 according to the first embodiment.

The on-vehicle external recognition apparatus 1000 is incorporated into, for example, a camera apparatus mounted in an automobile or into an integrated controller, is designed to recognize the external environment from an image(s) captured by cameras 1001 to 1004 for the camera apparatus, and is configured in this embodiment to recognize a travelable area around a driver's own vehicle.

The on-vehicle external recognition apparatus 1000 is configured of a computer having a CPU, a memory, I/O, and so on; and specified processing is programmed and the on-vehicle external recognition apparatus 1000 executes the processing in predetermined cycles T repeatedly.

The on-vehicle external recognition apparatus 1000 includes, as illustrated in FIG. 1, an image acquisition unit 1011, a feature point distance measurement unit 1021, an area division unit 1031, a first road surface area extraction unit 1041, an obstacle area extraction unit 1051, an image feature amount calculation unit 1061, a second road surface area extraction unit 1071, a separation degree diagnosis unit 1081, and a travelable area recognition unit 1101.

Figure 2:
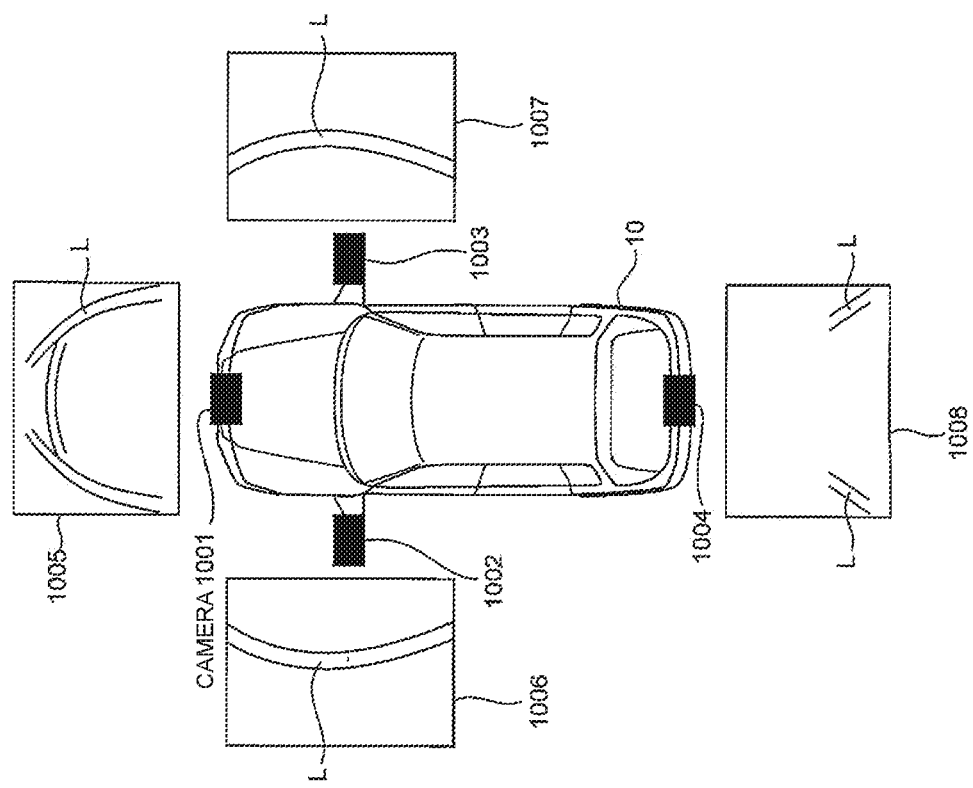
FIG. 2 is an explanatory diagram of an image acquisition unit according to the first embodiment of the present invention.

The image acquisition unit 1011 acquires an image including the environment around the driver's own vehicle. The image acquisition unit 1011 acquires any one or more images from captured images 1005 to 1008 of the surroundings of the driver's own vehicle from the cameras 1001 to 1004 mounted at positions capable of capturing images of the surroundings of the driver's own vehicle 10 as illustrated in FIG. 2. In this embodiment, the image acquisition unit 1011 acquires an image 1005 captured by the front camera 1001 when moving forwards and acquires an image 1008 captured by the rear camera 1004 when moving backwards on the basis of traveling directing information of the driver's own vehicle 10. The acquired image(s) is recorded as a two-dimensional array in a RAM. An input image will be hereinafter represented as IMGSRC[x][y]. Each of x, y represents a coordinate of the relevant image. The respective images 1005 to 1008 illustrated in FIG. 2 are images of the driver's own vehicle 10 when it is parked forwards within a parking frame and a marking line L for a parking space is captured.

The feature point distance measurement unit 1021 extracts a feature point FP[p] from the input image IMGSRC[x][y] and measures a distance from the driver's own vehicle 10 to the feature point FP[p] on the basis of a movement of the feature point FP[p] in the image as obtained by time-series tracking of the feature point FP[p] (a time-series change of the feature point). The feature point distance measurement unit 1021 detects the feature point FP[p] from the input image IMGSRC[x][y], performs time-series tracking of the feature point FP[p], and thereby calculates a three-dimensional distance table FPW[p] from an image coordinate table FPI[p] of each feature point. Under this circumstance, FPI[p] represents image coordinates (x, y); FPW[p] represents a one-dimensional array of the table having elements of the world coordinates (x, y, z) whose origin is a rear wheel axle of the driver's own vehicle; and p represents an ID when a plurality of feature points are detected.

The area division unit 1031 divides the input image IMGSRC[x][y] into a plurality of local areas R[r] (see FIG. 6). Under this circumstance, R[r] represents a one-dimensional array of a table having information indicating which pixel of the input image IMGSRC[x][y] belongs to the relevant local area; and r represents an ID of each area.

The first road surface area extraction unit 1041 extracts, as a first road surface area, a local area which is judged as a road surface on the basis of the distance information to the feature point FP[p] as measured by the feature point distance measurement unit 1021 and the position of the feature point FP[p] in the image. The first road surface area extraction unit 1041 extracts a local area R[r], to which the corresponding image coordinates FPI[p] belong, with respect to a point which satisfies a specified condition to judge it as the road surface from among world coordinates FPW[p] of the feature point by using the results of the feature point distance measurement unit 1021 and the area division unit 1031 and records a set of the relevant ID's as a first road surface area ID group rd1[d1]. Specifically speaking, the area which is judged as the road surface area is represented as R[rd1[d1]] and d1 is an ID indicating the area.

The obstacle area extraction unit 1051 extracts an obstacle area in the image on the basis of an image position of the feature point FP[p] by using the distance information of the feature point FP[p]. For example, if the feature point FP[p] exists at the position with a specified height or more from the ground, it is judged as an obstacle feature point and extracts that area as an obstacle area. The obstacle area extraction unit 1051 extracts a local area R[r], to which the corresponding image coordinates FPI[p] belong, with respect to a point which satisfies a specified condition to judge it as an obstacle from among the world coordinates FPW[p] of the feature point by using the results of the feature point distance measurement unit 1021 and the area division unit 1031 and records a set of the relevant ID's as an obstacle area ID group rb[b]. Specifically speaking, the area which is judged as the obstacle area is represented as R[rb[b]] and b is an ID indicating the relevant area.

The image feature amount calculation unit 1061 calculates a multi-dimensional image feature amount including color information for each local area in the image. The image feature amount calculation unit 1061 calculates an image feature vector FV[r] for each local area R[r] by using the results of the input image IMGSRC[x][y] and the area division unit 1031. Under this circumstance, the feature vector FV[r] is a one-dimensional array of a table having an N-dimensional vector.

The second road surface area extraction unit 1071: calculates similarity to the first road surface area with respect to at least one or more no-road-surface-extracted areas, which have not been extracted as the first road surface area by the first road surface area extraction unit 1041, from among the plurality of local areas in the image by using the image feature amount calculated by the image feature amount calculation unit 1061; and extracts, as a second road surface area, a local area judged as a road surface from at least one or more no-road-surface-extracted areas on the basis of the similarity.

Furthermore, when the obstacle area is extracted by the obstacle area extraction unit 1051, the second road surface area extraction unit 1071 calculates similarity to the first road surface area and the obstacle area with respect to the no-road-surface-extracted area(s) and the no-obstacle-extracted area(s) by using the image feature amount and extracts the second road surface area from the no-road-surface-extracted area(s) and the no-obstacle-extracted area(s) on the basis of the calculated similarity.

The second road surface area extraction unit 1071 finds a second road surface area ID group rd2[d2] by using the image feature vector FV[r] from areas which are not included in the first road surface area ID group rd1[d1] or the obstacle area ID group rb[b] from among the local areas R[r] by using the local areas R[r] obtained by the area division unit 1031, the first road surface area ID group rd1[d1] obtained by the first road surface area extraction unit 1041, the obstacle area ID group rb[b] obtained by the obstacle area extraction unit 1051, and the image feature vector FV[r] obtained by the image feature amount calculation unit 1061.

The separation degree diagnosis unit 1081 calculates a degree of separation between the first road surface area and the obstacle area on the basis of the image feature amount of the first road surface area and the image feature amount of the obstacle area. If the degree of separation is lower than a specified value, the second road surface area extraction unit 1071 does not output the second road surface area extraction result to the travelable area recognition unit 1101. The separation degree diagnosis unit 1081 calculates a degree of separation between a feature vector FV[rd1[d1]] belonging to the first road surface area ID group rd1[d1] and a feature vector FV[rb[b]] belonging to the obstacle area ID group rb[b] from among the image feature vector FV[r] by using information of the first road surface area ID group rd1[d1] obtained by the first road surface area extraction unit 1041, the obstacle area ID group rb[b] obtained by the obstacle area extraction unit 1051, and the image feature vector FV[r] obtained by the image feature amount calculation unit 1061. If the degree of separation is lower than a specified value, that is, if the feature amounts are similar to each other as a result of the calculation, the second road surface area extraction unit 1071 is notified of a separation difficulty flag SD indicating that it is difficult to extract the road surface area; and the second road surface area extraction unit 1071 stops its output.

The travelable area recognition unit 1101 recognizes a travelable area by using the first road surface area and the second road surface area. The travelable area recognition unit 1101 determines a final road surface area by using the first road surface area and the second road surface area and recognizes the travelable area from the final road surface area on the basis of at least one of camera geometry information and time series processing using past detection results. For example, the travelable area recognition unit 1101 determines the road surface area within the final image by using the local areas R[r] obtained by the area division unit 1031, the first road surface area ID group rd1[d1] obtained by the first road surface area extraction unit 1041, and the second road surface area ID group rd2[d2] obtained by the second road surface area extraction unit 1071 and further outputs, to a subsequent stage, the determined road surface area as a travelable area RDR[t] in the world coordinates (x, y, z) whose origin is the rear wheel axle of the driver's own vehicle by using the camera geometry information. Under this circumstance, t is a sign representing processing timing.

[Feature Point Distance Measurement Unit]

Next, the content of the processing by the feature point distance measurement unit 1021 will be explained with reference to FIGS. 3 and 4.

FIG. 3 is flowchart illustrating a flow of the processing by the feature point distance measurement unit 1021. Furthermore, FIG. 4 is an explanatory diagram of the processing by the feature point distance measurement unit 1021.

The feature point distance measurement unit 1021 executes the processing on the input image IMGSRC[x][y]. Firstly, in step S301, the feature point distance measurement unit 1021 extracts feature points FPI[p] from the input image IMGSRC[x][y]. Known methods such as Harris Corner are used to extract the feature points FPI[p]. As a result, image coordinates are obtained for each feature point.

Next, in step S302, the feature point distance measurement unit 1021 acquires a past image IMGSRC_P captured specified time before then and obtained from the same camera.

Subsequently, in step S303, the feature point distance measurement unit 1021 calculates the corresponding position in the past image IMGSRC_P of each feature point FPI[p] in a current image IMGSRC by an optical flow method and acquires mobile vectors FP_VX[p], FP_VY[p] of each feature point. Known methods such as the Lucas-Kanade method are used for the optical flow.

Then, in step S304, the feature point distance measurement unit 1021 calculates a three-dimensional position FPW[p] of each feature point FPI[p] around the driver's own vehicle by using the feature point FPI[p] and the mobile vectors FP_VX[p], FP_VY[p]. Known means is used as the calculation method. In this embodiment, a travel amount of the driver's own vehicle calculated by using the mobile vectors in the image and the driver's own vehicle positions DRC[t] and DRC[t−1] acquired by CAN is used. Under this circumstance, t is a sign representing the processing timing and the travel amount DRC[t] of the driver's own vehicle is X, Y, and a yaw angle in the coordinate system whose origin is the center of the rear wheel axle of the driver's own vehicle. The travel amount of X, Y, and the yaw angle is obtained from the driver's own vehicle positions DRC[t] and DRC[t−1].

Lastly in step S305, the feature point distance measurement unit 1021 transforms the three-dimensional position FPW[p] of each feature point to the coordinate system whose origin is the center of the vehicle's rear wheel axle and stores the transformed position as a distance table FPW[p].

Figure 4B:
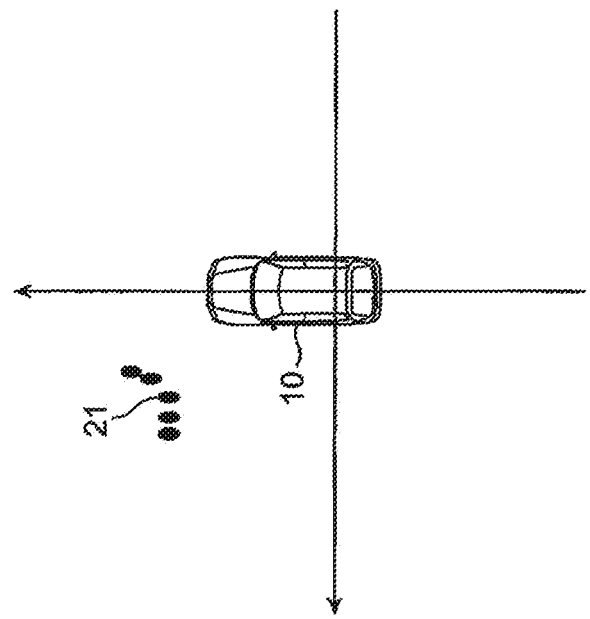
FIG. 4 is an explanatory diagram of processing by the feature point distance measurement unit according to the first embodiment of the present invention.
Figure 4A:
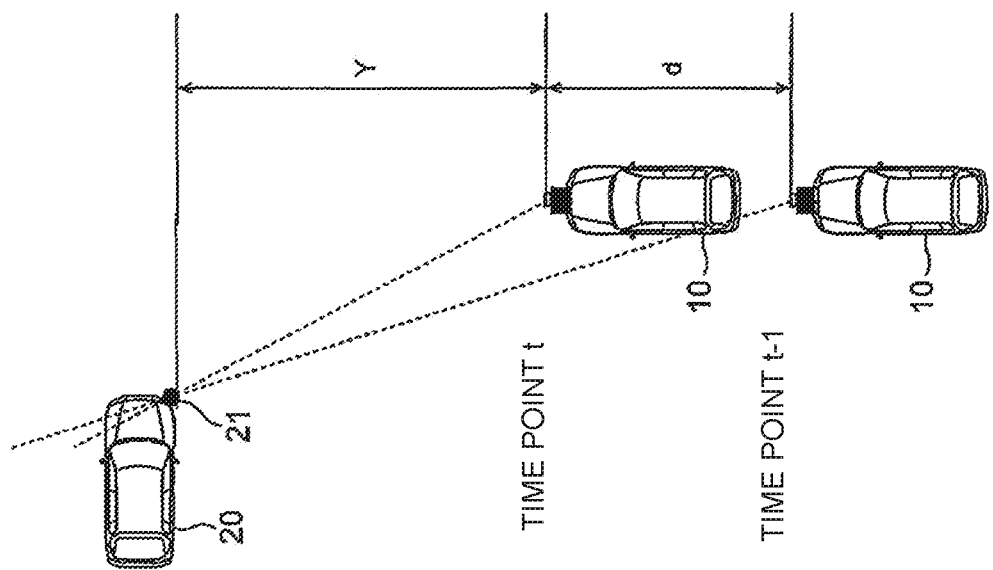

Referring to FIG. 4, as the driver's own vehicle past position DRC[t−1] and the driver's own vehicle current position DRC[t] change, a parallax error(s) occurs and the distance can be thereby measured. In an example illustrated in FIG. 4, distance Y to a parked vehicle 20 is measured based on the parallax error which has occurred as the driver's own vehicle 10 advanced by distance d from time point t−1 to time point t. Since the distance of each feature point in the image is measured, for example, a plurality of points 21 are measured as illustrated in FIG. 4B as a result of measurement relative to the parked vehicle 20.

[Area Division Unit]

Next, the content of processing by the area division unit 1031 will be explained with reference to FIGS. 5 and 6.

Figure 5:
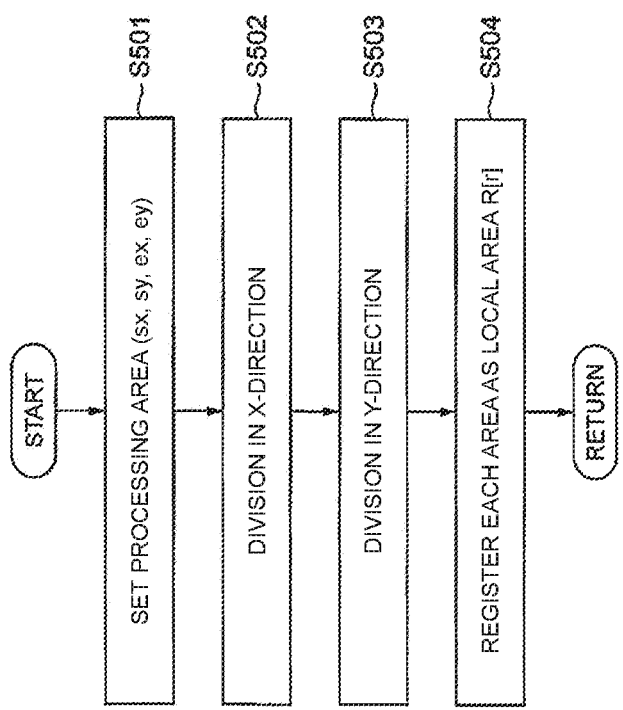
FIG. 5 is a flowchart illustrating processing by an area division unit according to the first embodiment of the present invention.

FIG. 5 is a flowchart illustrating a flow of processing by the area division unit 1031. Furthermore, FIG. 6 is an explanatory diagram illustrating an example of division by the area division unit 1031. In this embodiment, the area division unit 1031 executes the processing only at the time of initial activation and upon switching of the camera to be used along with changes in the traveling direction of the driver's own vehicle and the local areas R[r] do not change thereafter.

Firstly, in step S501, the area division unit 1031 sets a processing area 161. A starting point in the X-direction is set as sx, an end point in the X-direction is set as ex, a starting point in the Y-direction is set as sy, and an end point in the Y-direction is set as ey. The processing area 161 is set by avoiding an area of the driver's own vehicle which appears in an image captured by the camera.

Figure 6A:
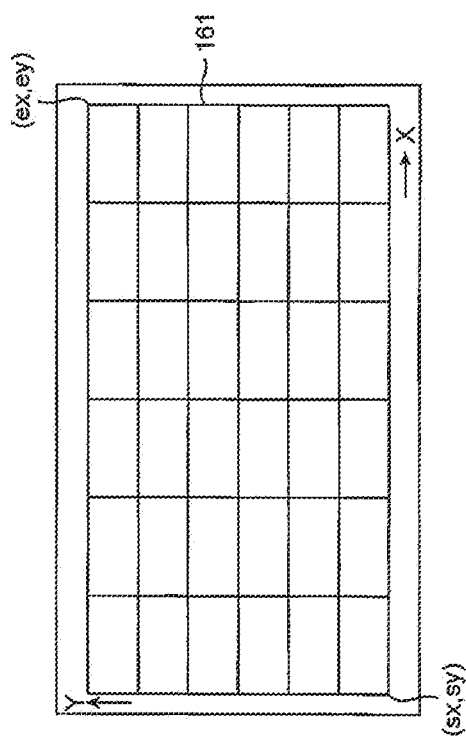
FIG. 6 is an explanatory diagram of processing by the area division unit according to the first embodiment of the present invention.
Figure 6B:
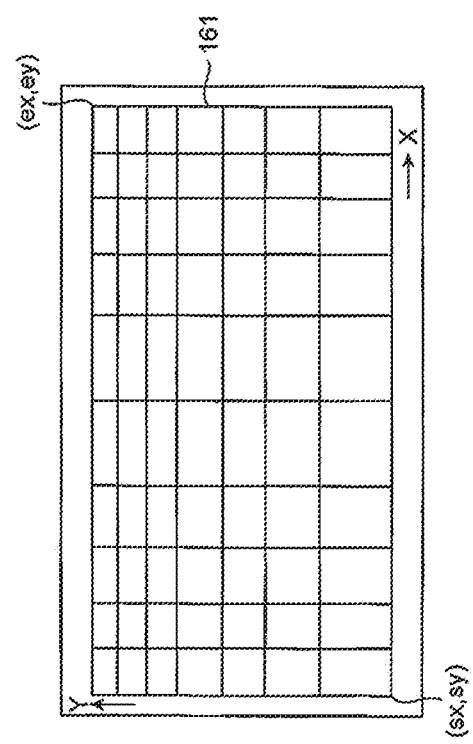

Next, in step S502, the area division unit 1031 divides the processing area 161 in the X-direction. The division may be performed by equally dividing the processing area 161 from the starting point sx to the end point ex as illustrated in FIG. 6A or by dividing the processing area 161 closer to the center of a lens of the camera into larger areas and the processing area 161 closer to its periphery into smaller areas according to lens distortion of the camera as illustrated in FIG. 6B.

Subsequently, in step S503, the area division unit 1031 divides the processing area 161 in the Y-direction. The division may be performed by equally dividing the processing area 161 from the starting point sy to the end point ey as illustrated in FIG. 6A or by dividing the processing area 161 closer to the center of the lens of the camera into larger areas and the processing area 161 closer to its periphery into smaller areas according to lens distortion of the camera as illustrated in FIG. 6B.

Lastly in step S504, the area division unit 1031 registers each rectangular starting point and end point information obtained by the division in steps S502 and S503 as the local area R[r].

Incidentally, other dividing methods of the area division unit 1031 include a method of acquiring a vanishing line from geometry information of the camera and dividing the processing area 161 closer to the vanishing line into finer areas and a method of inputting an image IMGSRC to the area division unit 1031 and using a result of grouping processing based on the luminance and color information of pixels; however, in either one of the cases, the division can be performed by known technology, so that an explanation about the other methods has been omitted here.

[First Road Surface Area Extraction Unit]

Figure 7:
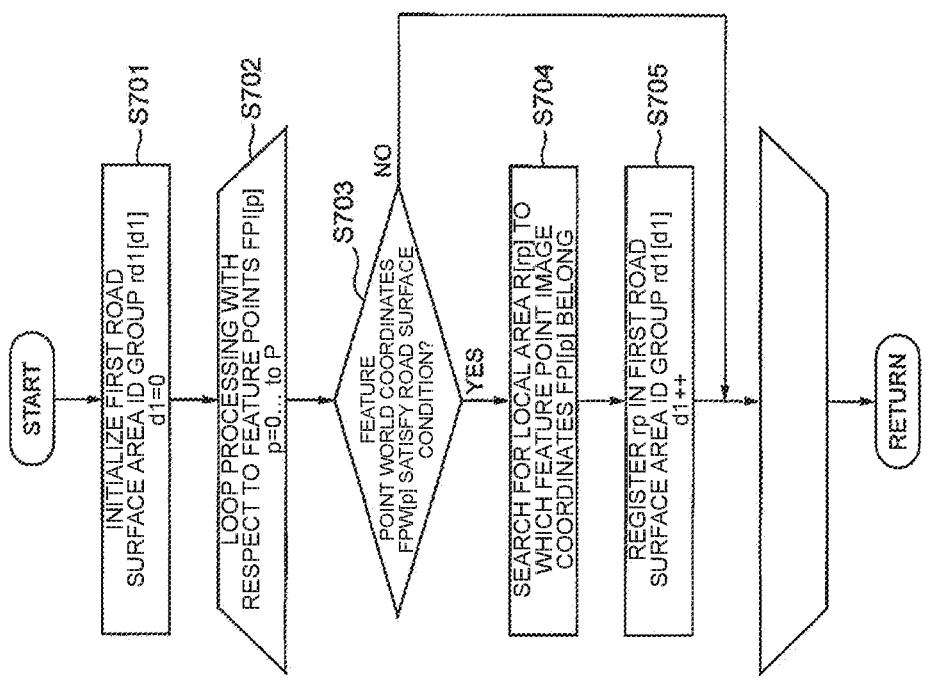
FIG. 7 is a flowchart illustrating processing by a first road surface area extraction unit according to the first embodiment of the present invention.

Next, the content of processing by the first road surface area extraction unit 1041 will be explained with reference to FIG. 7. In this processing, a local area(s) R[r] including, for example, a feature point whose height is a specified value or lower in the feature point world coordinates FPW[p] corresponding to the feature point FPI[p] is registered in the first road surface area ID group rd1[d1]. FIG. 7 is a flowchart illustrating a flow of the processing by the first road surface area extraction unit 1041.

Firstly, in step S701, the first road surface area extraction unit 1041 initializes the first road surface area ID group rd1[d1]. All registered values are initialized and d1=0 is set.

Next, in step S702, the first road surface area extraction unit 1041 repeatedly executes the processing on the feature points FPI[p] with p=0 to P with respect to step S703 to step S705.

Firstly, in step S703, the first road surface area extraction unit 1041 judges whether the feature point world coordinates FPW[p] satisfy a road surface condition or not. Regarding the basis for the judgment, whether or not the height of the feature point world coordinates FPW[p] is within a specified range, that is, whether or not the height is within a threshold value TH_ROAD whose borderline is zero is used. Alternatively, the first road surface area extraction unit 1041 may extract all points whose heights are within the threshold value TH_ROAD whose borderline is zero, from the feature point world coordinates FPW[p] and calculate a plane RPL by using least squares in step S701 in advance and then judge whether the distance between this plane and the feature point world coordinates FPW[p] is within a threshold value TH_HEIGHT2 or not.

If the condition is satisfied in step S703, then in step S704, the first road surface area extraction unit 1041 acquires image coordinates from the corresponding feature point image coordinates FPI[p] and finds a local area R[r] to which the acquired coordinates belong by using a transformation table or the like. The ID of the found feature point is represented as rp.

Next, in step S705, the first road surface area extraction unit 1041 registers the found rp in rd1[d1] and increments d1.

Incidentally, the feature point image coordinates FPI[p] and the world coordinates FPW[p] which are instantaneous values are found above as reference sources; however, for example, map information which has been accumulated by including past values may be used and set.

[Obstacle Area Extraction Unit]

Next, processing by the obstacle area extraction unit 1051 will be explained with reference to FIG. 8. Under this circumstance, for example, a local area R[r] including a feature point, for example, whose height of the feature point world coordinates FPW[p] corresponding to the feature point FPI[p] is higher than a specified value is registered in the obstacle area ID group rb[b].

Figure 8:
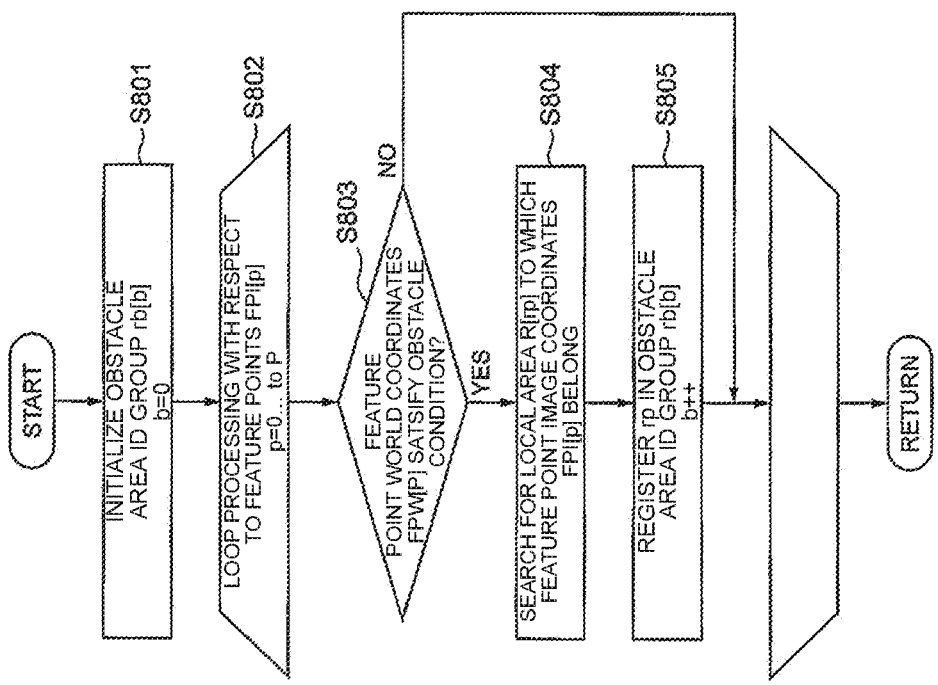
FIG. 8 is a flowchart illustrating processing by an obstacle area extraction unit according to the first embodiment of the present invention.

FIG. 8 is a flowchart illustrating a flow of the processing by the obstacle area extraction unit 1051.

Firstly, in step S801, the obstacle area extraction unit 1051 initializes the obstacle area ID group rb[b]. All registered values are initialized and b=0 is set.

Next, in step S802, the obstacle area extraction unit 1051 repeatedly executes the processing on the feature points FPI[p] with p=0 to P with respect to step S803 to step S805.

Firstly, in step S803, the obstacle area extraction unit 1051 judges whether the feature point world coordinates FPW[p] satisfy an obstacle condition or not. Regarding the basis for the judgment, whether or not the height of the feature point world coordinates FPW[p] is higher than a specified range, that is, whether or not the height of the feature point world coordinates FPW[p] is higher than a threshold value TH_OBJ or not is used. Under this circumstance, it is assumed that the following relation is satisfied: TH_OBJ>TH_ROAD. Alternatively, whether the distance between this plane and the feature point world coordinates FPW[p] is higher than a threshold value TH_OBJ2 or not may be used by using the plane RPL calculated by the first road surface area extraction unit 1041.

When the condition is satisfied in step S803, then in step S804, the obstacle area extraction unit 1051 acquires image coordinates from the corresponding feature point image coordinates FPI[p] and finds a local area R[r] to which the acquired coordinates belong by using a transformation table or the like. The ID of the found feature point is represented as rp.

Next, in step S805, the obstacle area extraction unit 1051 registers the found rp in rb[b] and increments b.

Incidentally, the feature point image coordinates FPI[p] and the world coordinates FPW[p] which are instantaneous values are found above as reference sources in the same manner as in the case of the first road surface area extraction unit 1041; however, for example, map information which has been accumulated by including past values and other sensor information may be used and set.

[Image Feature Amount Calculation Unit]

Next, the content of processing by the image feature amount calculation unit 1061 will be explained with reference to FIG. 9. In this processing, the image feature amount calculation unit 1061 generates a feature vector FV[r] from color and luminance information of the pixels x, y belonging to the local areas R[r] by using, for example, color and edge information.

Figure 9:
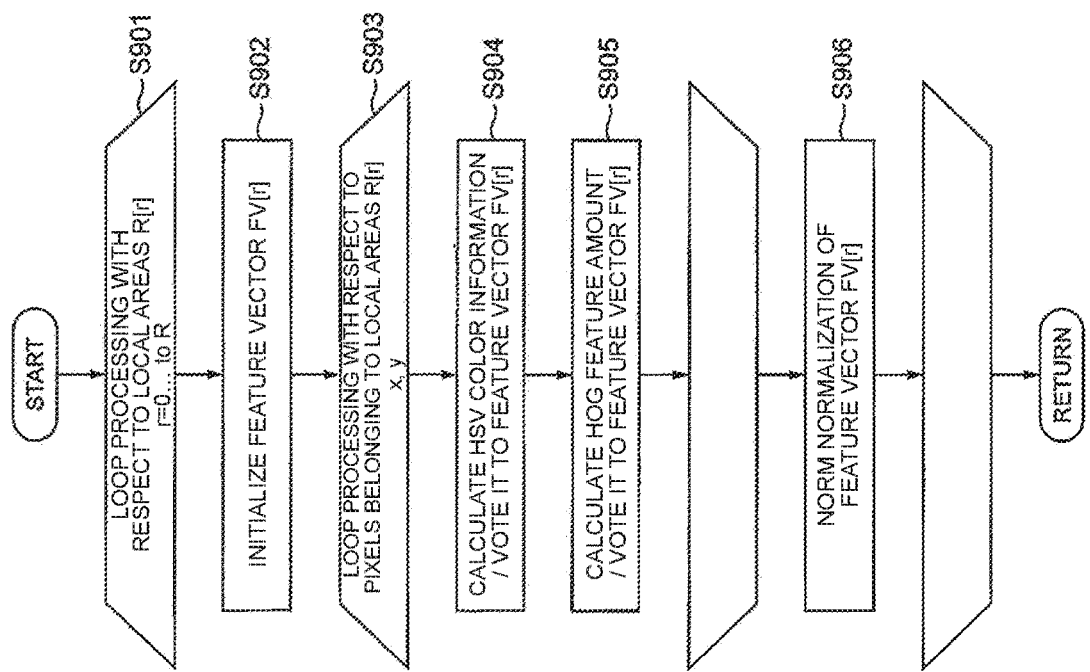
FIG. 9 is a flowchart illustrating processing by an image feature amount calculation unit according to the first embodiment of the present invention.

FIG. 9 is a flowchart illustrating a flow of the processing by the image feature amount calculation unit 1061.

In step S901, the image feature amount calculation unit 1061 repeatedly executes the processing on the local areas R[r] with r=0 to R with respect to step S902 to step S906.

Firstly, in step S902, the image feature amount calculation unit 1061 initializes the feature vector FV[r].

Next, in step S902, the image feature amount calculation unit 1061 repeatedly executes the processing on the pixels x, y belonging to the local area R[r] with respect to steps S904 and S905.

In step S904, the image feature amount calculation unit 1061 acquires color information of the pixels x, y, transforms it to HSV color representation, transforms it to previously set resolving power, and then vote it to the feature vector FV[r]. Since a method for transformation to the HSV color representation is known, an explanation about it has been omitted here.

In step S905, the image feature amount calculation unit 1061 calculates an HOG feature amount by using luminance gradient information (輝度勾配情報) of the pixels x, y, transforms it to previously set resolving power, and votes it to the feature vector FV[r]. Since a method for calculating the HOG feature amount is known, an explanation about it has been omitted here.

After conducting the vote by the processing in steps S904 and S905 with respect to all the pixels belonging to the local area R[r], the image feature amount calculation unit 1061 performs norm normalization of the feature vector FV[r] in step S906. The norm is normalized by each of H, S, V, and HOG.

The image feature amount calculation unit 1061 executes the above-described processing on all the local areas, that is, the local areas R[r] with r=0 to R, thereby calculating the feature vector FV[r].

[Second Road Surface Area Extraction Unit]

Next, the content of processing by the second road surface area extraction unit 1071 will be explained with reference to FIG. 10. In this processing, the second road surface area extraction unit 1071 estimates a road surface area with respect to local areas which do not belong to either the first road surface area ID group rd1[d1] or the obstacle area ID group rb[b], from among the local areas R[r], by using the similarity to the feature vector FV[r] and extracts the estimated road surface area as a second road surface area.

If the first road surface area extracted by the first road surface area extraction unit 1041 overlaps with the obstacle area extracted by the obstacle area extraction unit 1051, the relevant overlapping area is deleted from the first road surface area and the obstacle area and the areas obtained by the deletion are recognized as a no-road-surface-extracted area and a no-obstacle-extracted area, and the judgment by the second road surface area extraction unit 1071 is performed.

Furthermore, the obstacle area extraction unit 1051 finds a grounding position of the feature point in the image by using the distance information to the feature point and the camera geometry information which are used to set the obstacle area; and if the grounding position overlaps with the first road surface area extracted by the first road surface area extraction unit, that overlapping area is deleted from the first road surface area and the area obtained by the deletion is recognized as the no-road-surface-extracted area, and the judgment by the second road surface area extraction unit 1071 is performed.

Figure 10:
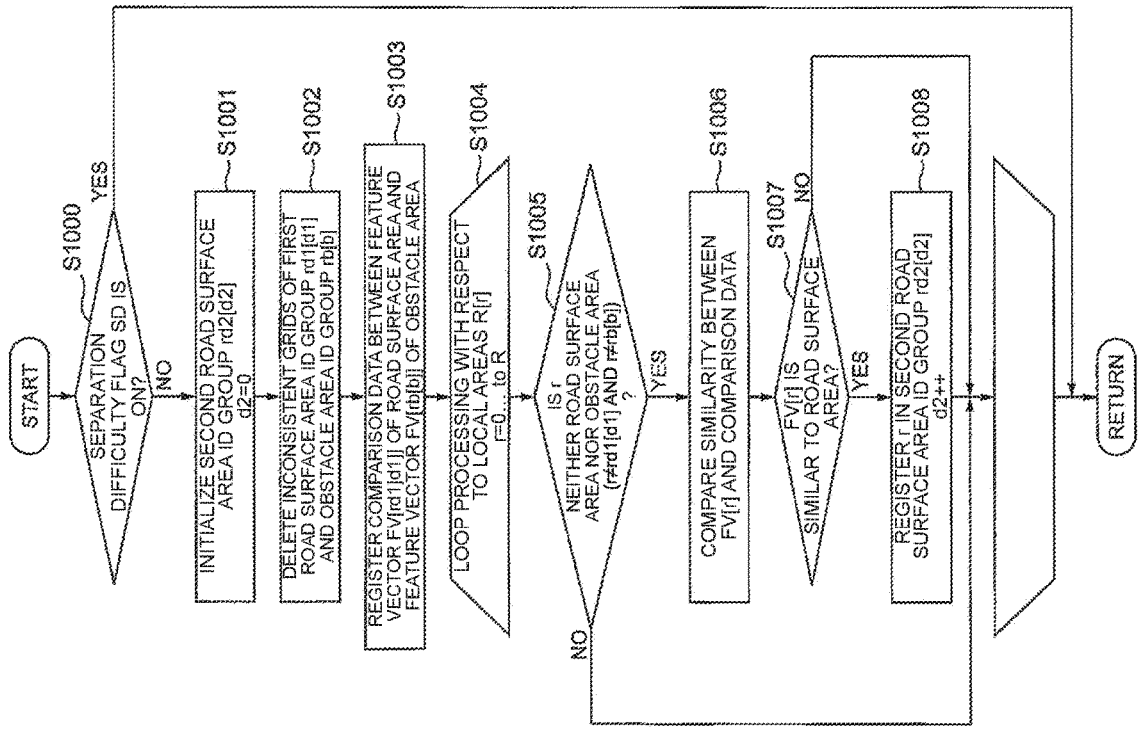
FIG. 10 is a flowchart illustrating processing by a second road surface area extraction unit according to the first embodiment of the present invention.

FIG. 10 is a flowchart illustrating a flow of processing by the second road surface area extraction unit 1071.

Firstly, in step S1000, the second road surface area extraction unit 1071 checks the separation difficulty flag; and if the flag is ON, the second road surface area extraction unit 1071 does not execute subsequent processing. If the flag is OFF, the second road surface area extraction unit 1071 executes the subsequent processing.

Next, in step S1001, the second road surface area extraction unit 1071 initializes the second road surface area ID group rd2[d2]. All registered values are initialized and d2=0 is set.

Subsequently, in step S1002, the second road surface area extraction unit 1071 deletes inconsistent grids from the first road surface area ID group rd1[d1] and the obstacle area ID group rb[b]. Regarding d1 of the first road surface area ID group rd1[d1], the second road surface area extraction unit 1071 searches the obstacle area ID group rb[b] to check if d1 is registered or not; and if d1 is registered, the second road surface area extraction unit 1071 deletes its ID from the first road surface area ID group rd1[d1] and the obstacle area ID group rb[b]. Specifically speaking, if the first road surface area overlaps with the obstacle area, the overlapping area is deleted from the first road surface area and the obstacle area. As a result of this processing, adverse effects which the girds registered in both the first road surface area ID group rd1[d1] and the obstacle area ID group rb[b] may have on the subsequent similarity judgment can be resolved.

Regarding further processing for deleting the inconsistent grids, the grounding position of the feature point in the image is found by using the distance information to the feature point and the camera geometry information which are used by the obstacle area extraction unit 1051 to set the obstacle area; and if the grounding position overlaps with the first road surface area, processing for deleting that overlapping area from the first road surface area is executed.

Firstly, the second road surface area extraction unit 1071 refers to the world coordinates FPW[p] of the feature point used for registration of the obstacle area ID group rb[b] and calculates the position in the image when its height is zero, by using the camera geometry information. Specifically speaking, the second road surface area extraction unit 1071 calculates the grounding position FPI0[p] of the feature point. The second road surface area extraction unit 1071 refers to a local area R[r] to which the grounding position FPI0[p] of this feature point belongs, and searches the first road surface area ID group rd1[d1] to check if it is registered or not. If it is registered, the second road surface area extraction unit 1071 deletes its ID from the first road surface area ID group rd1[d1].

If the feature point of the obstacle exists in the vicinity of the road surface, this matches the condition for the first road surface area extraction processing, so that the feature amount of the obstacle may be registered as the road surface area, which sometimes results in adverse effects of, for example, expanding to become larger than the actual road surface area, judging the obstacle as the road surface area upon the second road surface area extraction processing, or causing the separation degree diagnosis unit 1081 to determine that it is difficult to perform the separation. As a result of this processing, these troubles can be avoided.

Next, in step S1003, the second road surface area extraction unit 1071 processes the feature vector FV[rd1[d1]] of the road surface area and the feature vector FV[rb[b]] of the obstacle area by means of the similarity calculation so that they can be easily used for the subsequent processing. If the number of dimensions of the data is low, it can be used as it is; however, if the number of dimensions is high, the data volume may be reduced by a dimensional compression method such as principal component analysis. In this embodiment, the data is used without particular compression.

Subsequently, in step S1004, the second road surface area extraction unit 1071 repeatedly executes the processing on the local areas R[r] with r=0 to R with respect to steps S1005 to S1008.

Firstly, in step S1005, the second road surface area extraction unit 1071 checks if r is not registered in either the first road surface area ID group rd1[d1] or the obstacle area ID group rb[b]. If r is not registered, the processing proceeds to step S1006. If r is registered, the second road surface area extraction unit 1071 increments r and executes step S1005 again.

Next, in step S1006, the second road surface area extraction unit 1071 calculates the similarity between the feature vector FV[rd1[d1]] of the road surface area and the feature vector FV[rb[b]] of the obstacle area with respect to the feature vector FV[r]. In this embodiment, the K-nearest neighbors algorithm is used. Since the K-nearest neighbors algorithm is a known technique, an explanation of its details has been omitted; however, all distances between the feature vector FV[r] and the feature vector FV[rd1[d1]] of the road surface area and the feature vector FV[rb[b]] of the obstacle area are calculated and whether the nearest k vectors are similar to the feature vector of the road surface area or the feature vector of the obstacle area is calculated on the basis of a majority decision on which of the feature vector of the road surface area or the feature vector of the obstacle area has more vectors.

Then, in step S1007, if it is judged that the feature vector FV[r] is similar to the feature vector of the road surface area, the processing proceeds to step S1008 and the second road surface area extraction unit 1071 registers r in the second road surface area ID group rd2[d2] and increments d2.

The above-described processing is executed as loop processing.

[Separation Degree Diagnosis Unit]

Next, the content of processing by the separation degree diagnosis unit 1081 will be explained with reference to FIG. 11. In this processing, the separation degree diagnosis unit 1081 judges whether or not the feature vector FV[r] belonging to the first road surface area ID group rd1[d1] and the feature vector FV[r] belonging to the obstacle area ID group rb[b] are distributed in a manner separable within a feature space.

Figure 11:
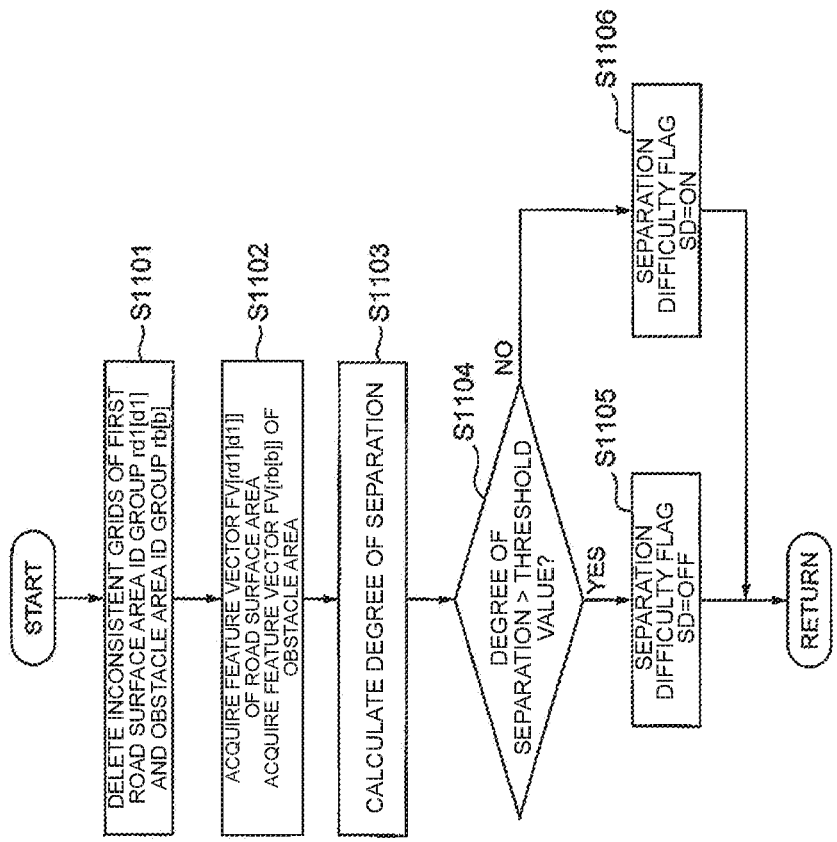
FIG. 11 is a flowchart illustrating processing by a separation degree diagnosis unit according to the first embodiment of the present invention.

FIG. 11 is a flowchart illustrating a flow of the processing by the separation degree diagnosis unit 1081.

Firstly, in step S1101, the separation degree diagnosis unit 1081 executes the same processing as that of step S1002 by the second road surface area extraction unit 1071 and deletes an inconsistent feature vector(s).

Next, in step S1102, the separation degree diagnosis unit 1081 acquires the feature vector FV[rd1[d1]] of the road surface area and the feature vector FV[rb[b]] of the obstacle area.

Then, in step S1103, the separation degree diagnosis unit 1081 calculates the degree of separation between the feature vector FV[rd1[d1]] of the road surface area and the feature vector FV[rb[b]] of the obstacle area. In this embodiment, the separation degree diagnosis unit 1081 executes linear discrimination processing on both the vectors, calculates an eigenvector corresponding to a maximum eigenvalue, maps the feature vector FV[rd1[d1]] of the road surface area and the feature vector FV[rb[b]] of the obstacle area onto this eigenvector, and uses interclass variance VB of the obtained one-dimensional data group as a degree of separation SS.

Subsequently, in step S1104, the separation degree diagnosis unit 1081 compares the degree of separation SS with a threshold value TH_SS; and if the degree of separation SS is higher than the threshold value, the separation degree diagnosis unit 1081 sets OFF the separation difficulty flag SD in step S1105; and if the degree of separation SS is lower than the threshold value, the separation degree diagnosis unit 1081 sets ON the separation difficulty flag SD in step S1106. Incidentally, the separation degree diagnosis unit 1081 executes the processing earlier than the second road surface area extraction unit 1071 and the second road surface area extraction unit 1071 switches the processing depending on the result of the separation difficulty flag SD.

[Travelable Area Recognition Unit]

Next, the content of processing by the travelable area recognition unit 1101 will be explained with reference to FIGS. 12 and 13. In this processing, the travelable area recognition unit 1101 integrates the results of the first road surface area and the second road surface area and further decides a final travelable area by using continuity, camera geometry information, and time series information.

Figure 12:
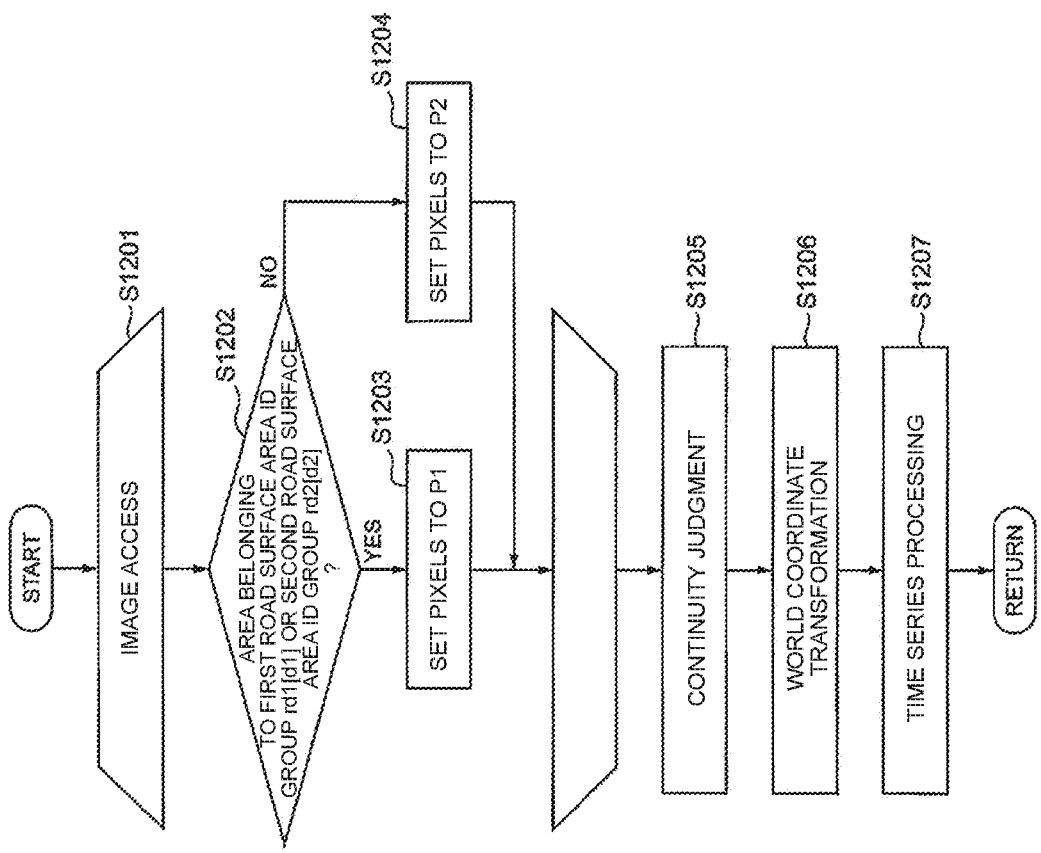
FIG. 12 is a flowchart illustrating processing by a travelable area recognition unit according to the first embodiment of the present invention.
Figure 13A:
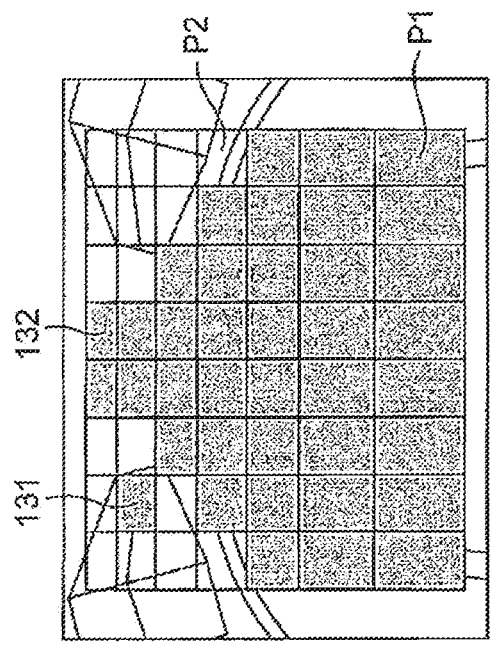
FIG. 13 is an explanatory diagram of processing by the travelable area recognition unit according to the first embodiment of the present invention.
Figure 13B:
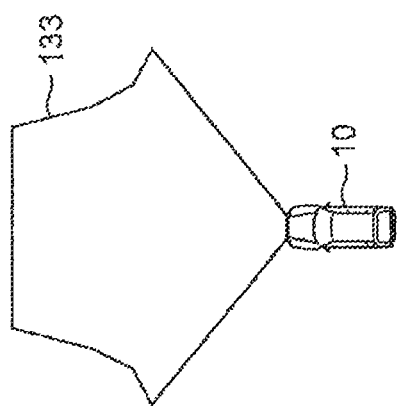
Figure 13C:
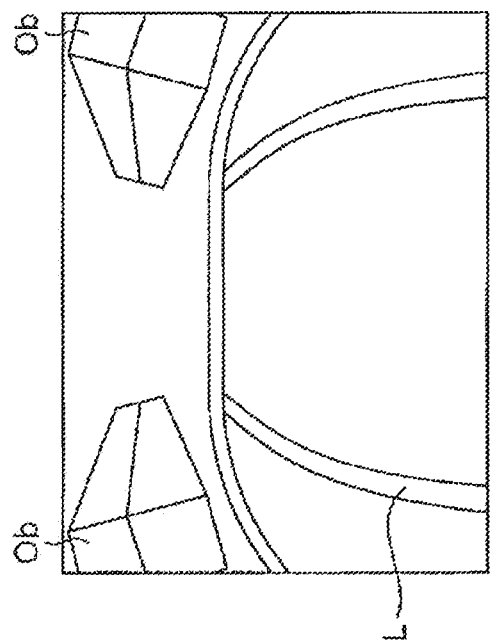
Figure 13D:
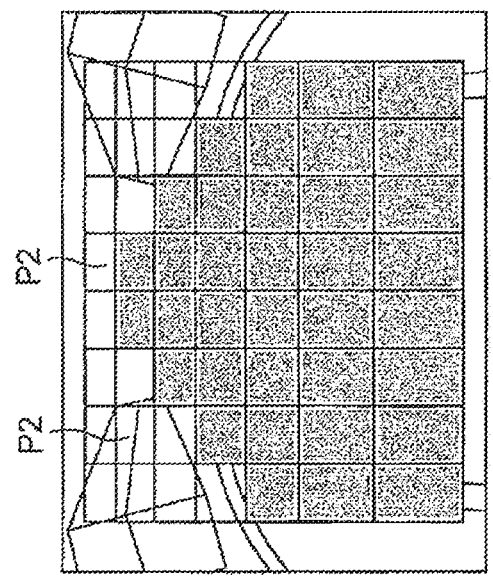

FIG. 12 is a flowchart illustrating a flow of the processing by the travelable area recognition unit 1101. Furthermore, FIG. 13 is an explanatory diagram of the processing by the travelable area recognition unit 1101. FIGS. 13A to 13C are images of an area in front of the driver's own vehicle 10 and white lines L for marking the relevant section of a parking space and obstacles Ob positioned ahead are captured in these images. FIG. 13D illustrates the driver's own vehicle 10 and a travelable area ahead of it.

Firstly, in step S1201, the travelable area recognition unit 1101 prepares for access to a pixel(s) of a resultant image IMGRES in which the final result is to be reflected. The travelable area recognition unit 1101 repeatedly executes the processing from step S1202 to S1204 described below.

Firstly, in step S1202, the travelable area recognition unit 1101 judges whether the accessed pixel belongs to the first road surface area ID group rd1[d1] or the second road surface area ID group rd2[d2]. If it belongs to the first road surface area ID group rd1[d1] or the second road surface area ID group rd2[d2], the travelable area recognition unit 1101 proceeds to step S1203 and sets the pixel to P1. If it does not belong to the first road surface area ID group rd1[d1] or the second road surface area ID group rd2[d2], the travelable area recognition unit 1101 proceeds to step S1204 and sets the pixel to P2. The above-described processing is repeated.

Incidentally, if the pixels are accessed as described above, a large amount of processing time is required. So, the processing on the area R[r] may be executed repeatedly and the result of such processing may be reflected in the resultant image IMGRES in which the final result is to be reflected. FIG. 13B is an example of this case.

Next, in step S1205, the travelable area recognition unit 1101 removes noise by using the continuity of the pixels. The travelable area recognition unit 1101 searches the resultant image IMGRES from the lower part area of the image towards the upper part of the image and keeps searching while the pixels are P1, that is, the road surface area; and the travelable area recognition unit 1101 counts the number of positions or times when the pixels become P2; and the travelable area recognition unit 1101 stops searching when such number reaches a specified number of times or at a position where the relevant area no longer is the road surface area in terms of camera geometry. This processing is executed on all the x-coordinates of the image or at positions sampled at a specified interval; and as a result, the relevant area from the lower part area of the image to the position where the search is terminated is determined as the road surface area. FIG. 13C shows its example. In the example illustrated in FIG. 13B, the pixels of an enclave 131 and the sky area 132 in the obstacle area are set to P1 as a result of the processing from step S1201 to step S1204. However, as a result of the continuity judgment in step S1205, the pixels of the above-mentioned portions are set to P2 as illustrated in FIG. 13C and judged that they are not the road surface area.

Next, in step S1206, the travelable area recognition unit 1101 transforms the upper-end positions from among the results obtained in step S1205 into the world coordinates, finds a polygon area which connects the respective obtained points and the camera-installed position, and sets it as an instantaneous value RDT[t] of the travelable area. Under this circumstance, t is a sign representing the processing timing. FIG. 13D shows its example.

Next, in step S1207, the time series processing is executed. The time series processing in this embodiment will be explained with reference to FIG. 14 and FIG. 15.

Figure 14:
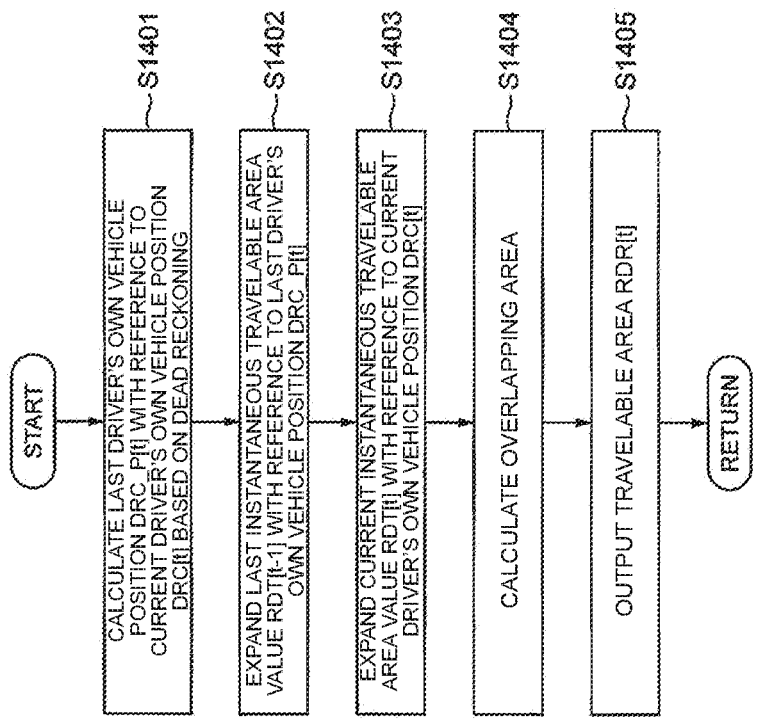
FIG. 14 is a flowchart illustrating time series processing by the travelable area recognition unit according to the first embodiment of the present invention.

FIG. 14 is a flowchart illustrating a flow of the time series processing in step S1207. Furthermore, FIG. 15 is an explanatory diagram of the time series processing.

Firstly, in step S1401, the travelable area recognition unit 1101 acquires the current driver's own vehicle position DRC[t] and the last driver's own vehicle position DRC[t−1] on the basis of dead reckoning information and calculates the last driver's own vehicle position DRC_P[t] based on the current driver's own vehicle position DRC[t]. FIG. 15A shows its example. Referring to FIG. 15A, the current driver's own vehicle position is indicated with a solid line and the last driver's own vehicle position is indicated with a dotted line.

Next, in step S1402, the travelable area recognition unit 1101 acquires a last instantaneous travelable area value RDT[t−1] based on the last driver's own vehicle position DRC_P[t]. FIG. 15B shows its example. Referring to FIG. 15B, the last instantaneous travelable area value 151 is indicated with a broken line.

Subsequently, in step S1403, the travelable area recognition unit 1101 develops a current instantaneous travelable area value RDT[t] based on the current driver's own vehicle position DRC[t]. FIG. 15C shows its example. Referring to FIG. 15C, the current instantaneous travelable area value 152 is indicated with a solid line.

Then, in step S1404, the travelable area recognition unit 1101 calculates an overlapping area between the last instantaneous travelable area value RDT[t−1] and the current instantaneous travelable area value RDT[t]. FIG. 15D illustrates the overlapping area between the last time instantaneous travelable area value and the current instantaneous travelable area value as a gray area 153.

Furthermore, in step S1405, the travelable area recognition unit 1101 outputs the overlapping area as a current travelable area RDR[t]. Incidentally, the above-described embodiment has described the case where the travelable area recognition unit 1101 recognizes the travelable area with respect to the road surface area extracted by the first road surface area extraction unit 1041 and the road surface area extracted by the second road surface area extraction unit 1071 on the basis of both the camera geometry information and the time series processing using the past detection results; however, at least one of them may be used.

When the on-vehicle external recognition apparatus 1000 according to this embodiment is employed as explained above, the first road surface area and the obstacle area are extracted from a plurality of divided local areas in the image by using the distance measurement result based on the feature points; and furthermore, regarding the local areas in which no feature point exists and which cannot be classified, the image feature amount is extracted; the similarity between that image feature amount and the first road surface area and the obstacle area is calculated; and the second road surface area is extracted based on the similarity. Then, the first road surface area extraction result and the second road surface area extraction result are integrated together, thereby generating the travelable area.

The operational advantage of the above will be explained with reference to FIG. 16 and FIG. 17. FIG. 16 and FIG. 17 are explanatory diagrams for explaining the above-described sequence of flow.

Figure 16A:
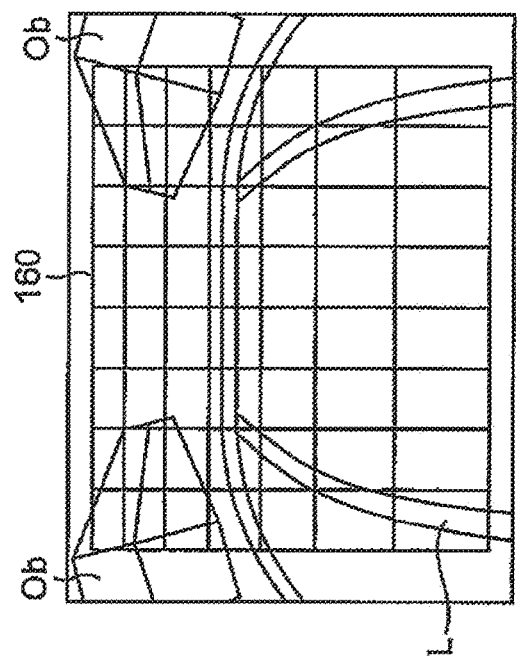
FIG. 16 is an explanatory diagram of the processing according to the first embodiment of the present invention.
Figure 16B:
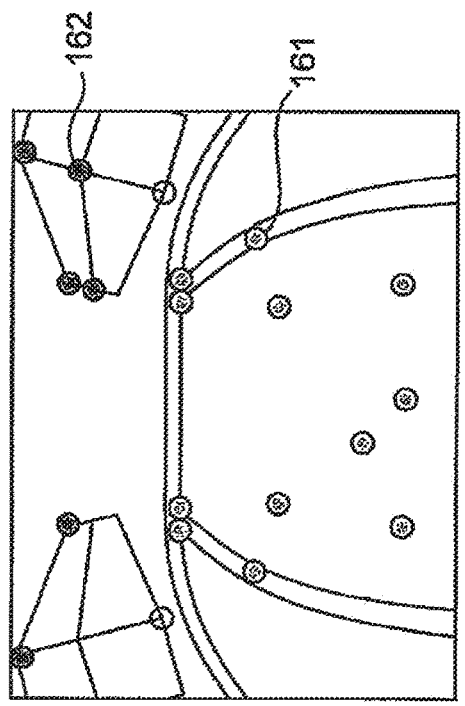

FIG. 16A illustrates a division example of local areas 160 and FIG. 16B illustrates a distance measurement example using the feature points. Referring to FIG. 16B, light bray points 161 are feature points which match the condition for the first road surface area extraction processing; and dark gray points 162 are feature points which match the condition for the obstacle area extraction processing.

Figure 16C:
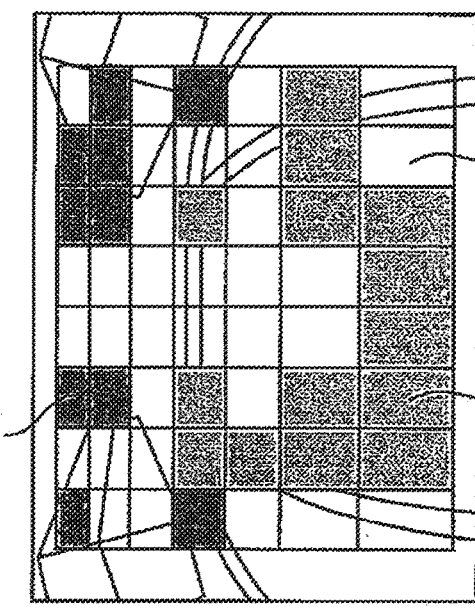

FIG. 16C is an example of the first road surface area extraction processing and the obstacle area extraction processing. A local area(s) 163 extracted as the road surface area by the first road surface area extraction processing is indicated with light gray; and a local area (s) 164 extracted as the obstacle area by the obstacle area extraction processing is indicated with dark gray. Referring to FIG. 16C, the local areas in FIG. 16A including the feature points 161 which match the condition for the first road surface area extraction processing, from among the feature points in FIG. 16B, are indicated as the road surface area 163. Furthermore, the local areas including the feature points 162 which match the condition for the obstacle area extraction processing, from among the feature points in FIG. 16B, are indicated as the obstacle area 164.

Figure 16D:
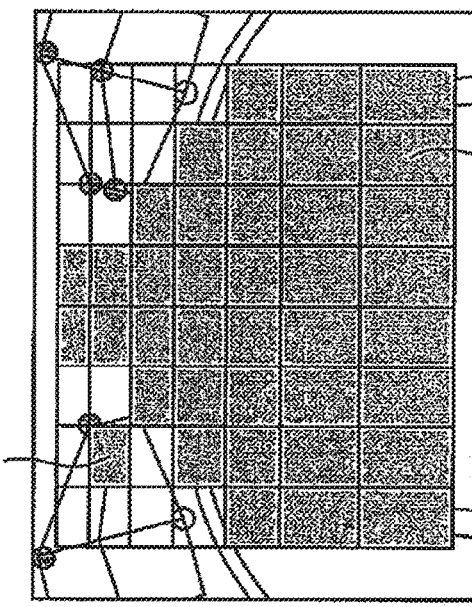

FIG. 16D is an example where the result of the second road surface area extraction processing is integrated. Regarding a local area(s) 165 which is not gray in FIG. 16C, whether the relevant local area 165 is the road surface area or not is judged based on the similarity of the image feature vector. As illustrated in the drawing, the local area(s) 165 which has failed to be judged at the time point of FIG. 16C can be set as the road surface area 163 by using the similarity to the area which is set as the road surface area by the extraction of the first road surface area. Meanwhile, a far part 166 of the obstacle area is also judged as the road surface area here. This part is judged later as not the road surface area 163 by using the camera geometry information or the like in step S1205 by the travelable area recognition unit which is the subsequent processing.

Figure 17A:
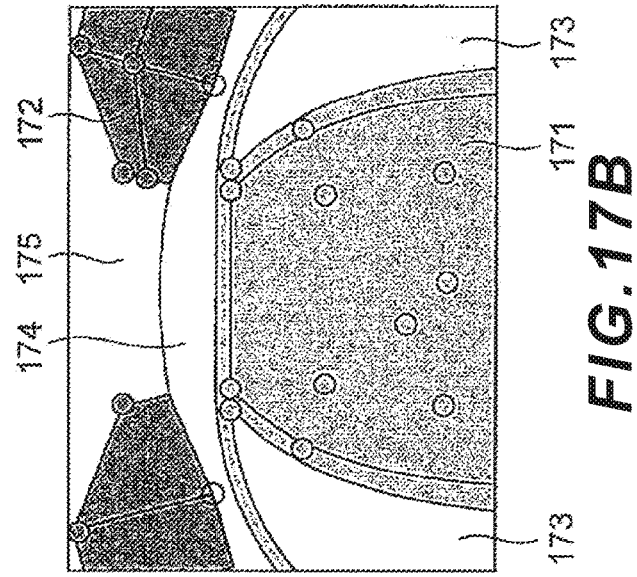
FIG. 17 is an explanatory diagram of the processing according to the first embodiment of the present invention.

Furthermore, FIG. 17A is an example of the local areas obtained as a result of executing grouping processing based on the luminance and color information of the pixels by using the input image in the area division processing.

Figure 17B:
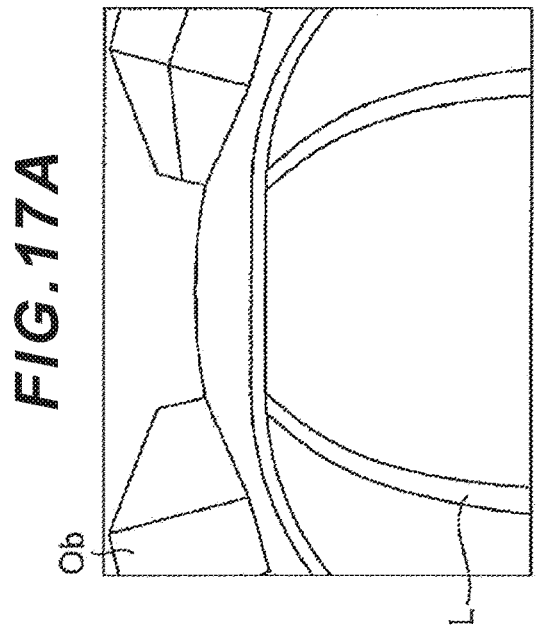

FIG. 17B is an example where the first road surface area extraction processing and the obstacle area extraction processing are executed by using the feature point information of FIG. 16B with respect to the area division result illustrated in FIG. 17A. The result of the first road surface area extraction processing is indicated as a light gray area 171 and the obstacle area extraction result is indicated as a dark gray area 172.

Figure 17C:
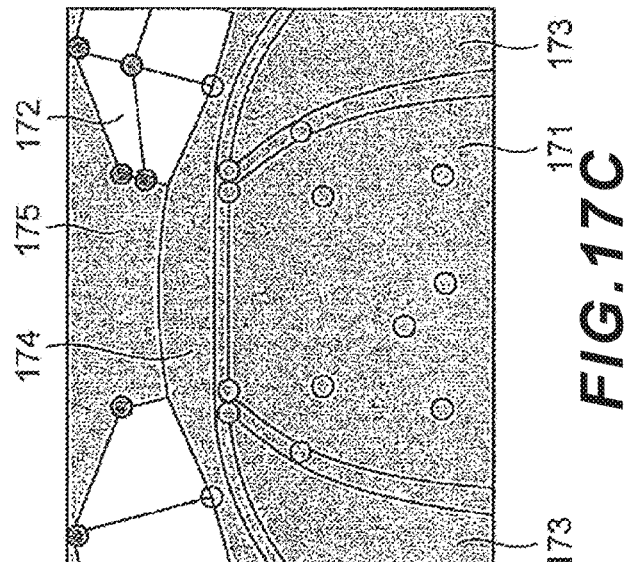

FIG. 17C is an example where the local area(s) which is not classified as either the road surface area or the obstacle area is extracted as the road surface area by the second road surface area extraction processing by using the similarity between the road surface area and the obstacle area as obtained in FIG. 17B. As illustrated in the drawing, a road surface area 173 outside the white line L, which has failed to be judged at the time point of FIG. 17B, and a far road surface area 174 can be judged as the road surface are by using the similarity to an image feature vector of a road surface area 171 inside the white line. Meanwhile, since a far sky area 175 or the like is also often similar to the road surface area depending on the weather and the environment, it is judged as the road surface area in this example. Under this circumstance, the far sky area 175 is judged later as not the road surface area in step S1205 of the travelable area recognition unit which is the subsequent processing.

Furthermore, when the image feature amount within the area obtained by the first road surface area extraction processing and the obstacle area extraction processing is diagnosed by the separation degree diagnosis unit at the time point of FIG. 16C or FIG. 17B and if the degree of separation is lower than a specified value, that is, if the interclass variance is low, the extraction of the second road surface area is not performed. If the degree of separation is lower than the specified value, the second road surface area extraction unit 1071 does not output the second road surface area extraction result to the travelable area recognition unit. As a result of this processing, the road surface area will not be extracted based on ambiguous information and it becomes possible to inhibit false recognition.

If the above-described on-vehicle external recognition apparatus 1000 is employed, the road surface area which is located far from the driver's own vehicle and regarding which the edge observation is difficult can be extracted as the road surface area. Therefore, for example, if the on-vehicle external recognition apparatus 1000 is used for an automobile which performs vehicle control for assisting or automating the driver's driving operation, it is possible to perform the control with high precision.

Second Embodiment

Next, a second embodiment of the on-vehicle external recognition apparatus according to the present invention will be explained with reference to the relevant drawings.

Figure 18:
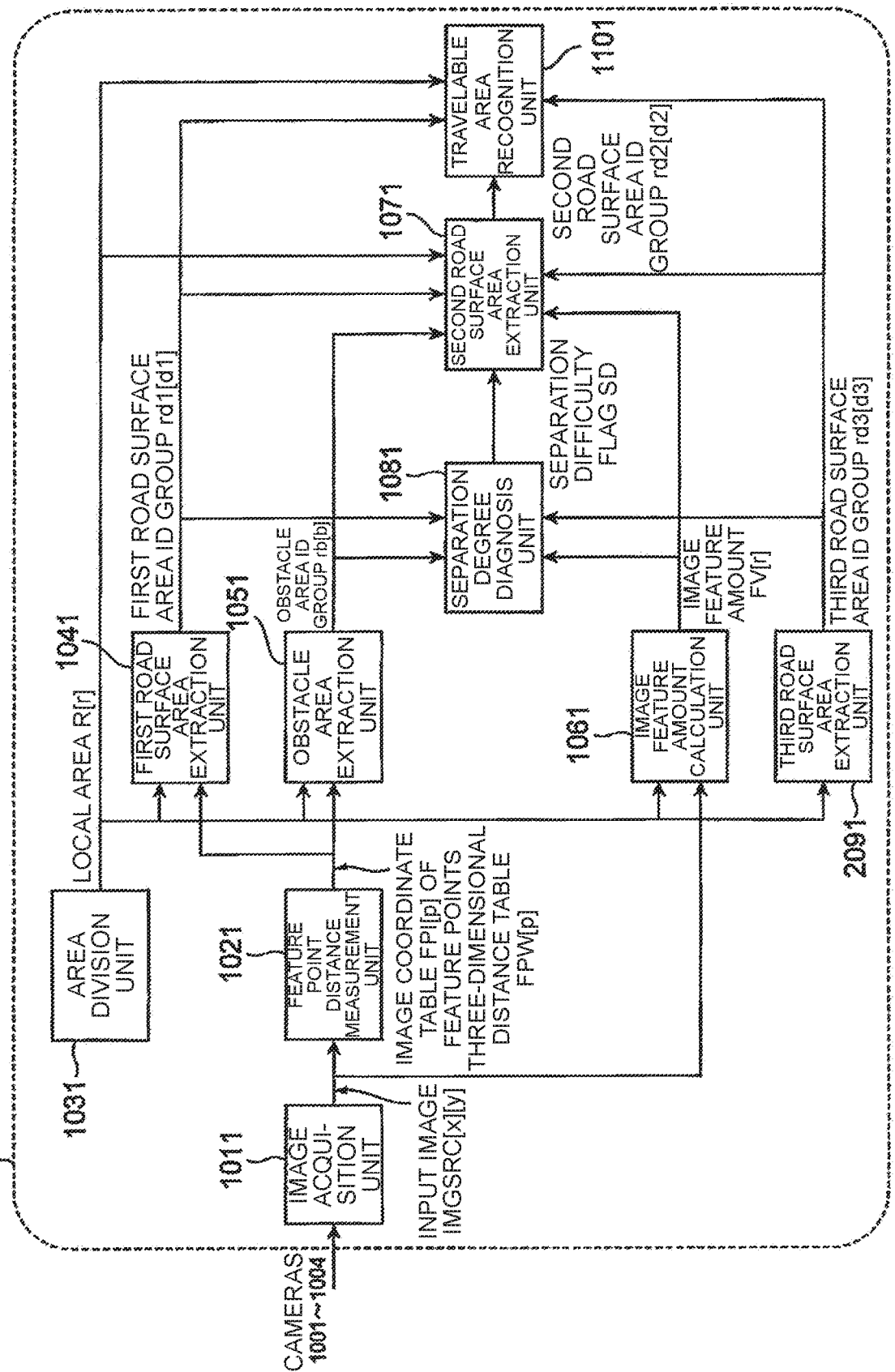
FIG. 18 is a block diagram of an on-vehicle external recognition apparatus according to a second embodiment of the present invention.

FIG. 18 is a block diagram illustrating the configuration of an on-vehicle external recognition apparatus 2000 according to the second embodiment. Incidentally, in the following explanation, only different parts from the on-vehicle external recognition apparatus 1000 according to the aforementioned first embodiment will be described in detail and the same reference numerals as those in the first embodiment are assigned to parts similar to those of the first embodiment and any detailed explanation about them have been omitted.

Characteristic points of this embodiment are that the on-vehicle external recognition apparatus 2000 has a third road surface area extraction unit 2091 for extracting the road surface area by a method different from that of the first road surface area extraction unit 1041 and information of the extraction result is input to the second road surface area extraction unit 1071, the separation degree diagnosis unit 1081, and the travelable area recognition unit 1101, respectively.

The on-vehicle external recognition apparatus 2000 is incorporated into, for example, a camera apparatus mounted in an automobile or into an integrated controller, is designed to recognize the external environment from an image(s) captured by the cameras 1001 to 1004 for the camera apparatus, and is configured in this embodiment to detect the road surface area around the driver's own vehicle.

The on-vehicle external recognition apparatus 2000 is configured of a computer having a CPU, a memory, I/O, and so on; and specified processing is programmed and the on-vehicle external recognition apparatus 2000 executes the processing in predetermined cycles repeatedly.

The third road surface area extraction unit 2091 extracts areas which satisfy a specified condition, from among the local areas R[r] of the area division unit 1031, and records a set of their ID's as a third road surface area ID group rd3[d3]. Specifically speaking, the area(s) which is judged as the road surface area is represented by R[rd3[d3]] and d3 is an ID representing the area.

The second road surface area extraction unit 1071 finds the second road surface area ID group rd2[d2], by using the image feature vector FV[r], from the areas which are not included in the first road surface area ID group rd1[d1], the third road surface area ID group rd3[d3], and the obstacle area ID group rb[b] from among the local areas R[r] by using the local areas R[r] obtained by the area division unit 1031, the first road surface area ID group rd1[d1] obtained by the first road surface area extraction unit 1041, the obstacle area ID group rb[b] obtained by the obstacle area extraction unit 1051, the image feature vector FV[r] obtained by the image feature amount calculation unit 1061, and further the third road surface area ID group rd3[d3] obtained by the third road surface area extraction unit 2091. In this embodiment, the subsequent processing becomes the same as that of the first embodiment by adding and using the third road surface area ID group rd3[d3], which is added to the input of the processing, to after the first road surface area ID group rd1[d1], so that any detailed description of the processing has been omitted.

The separation degree diagnosis unit 1081 calculates the degree of separation between the feature vector FV belonging to the first road surface area ID group rd1[d1] and the third road surface area ID group rd3[d3] and the feature vector FV belonging to the obstacle area ID group rb[b], from among the image feature vector FV[r], by using the first road surface area ID group rd1[d1] obtained by the first road surface area extraction unit 1041, the obstacle area ID group rb[b] obtained by the obstacle area extraction unit 1051, the image feature vector FV[r] obtained by the image feature amount calculation unit 1061, and further the third road surface area ID group rd3[d3] obtained by the third road surface area extraction unit 2091.

If the feature amounts are similar to each other as a result of the calculation, the second road surface area extraction unit 1071: is notified of the separation difficulty flag SD indicating that it is difficult to extract the road surface area; and stops the output. In this embodiment, the subsequent processing becomes the same as that of the first embodiment by adding and using the third road surface area ID group rd3[d3], which is added to the input of the processing, to after the first road surface area ID group rd1[d1], so that the detailed description of the processing has been omitted.

The travelable area recognition unit 1101 determines the road surface area in the final image by using the local areas R[r] obtained by the area division unit 1031, the first road surface area ID group rd1[d1] obtained by the first road surface area extraction unit 1041, the second road surface area ID group rd2[d2] obtained by the second road surface area extraction unit 1071, and further the third road surface area ID group rd3[d3] obtained by the third road surface area extraction unit 2091 and further outputs the determined road surface area as the travelable area RDR[t] in the world coordinates (x, y, z), whose origin is the rear wheel axle of the driver's own vehicle, by using the camera geometry information to a subsequent stage. In this embodiment, the subsequent processing becomes the same as that of the first embodiment by adding and using the third road surface area ID group rd3[d3], which is added to the input of the processing, to after the first road surface area ID group rd1[d1], so that the detailed description of the processing has been omitted.

[Third Road Surface Area Extraction Unit]

The content of processing by the third road surface area extraction unit 2091 will be explained with reference to FIG. 19 and FIG. 20.

Figure 19:
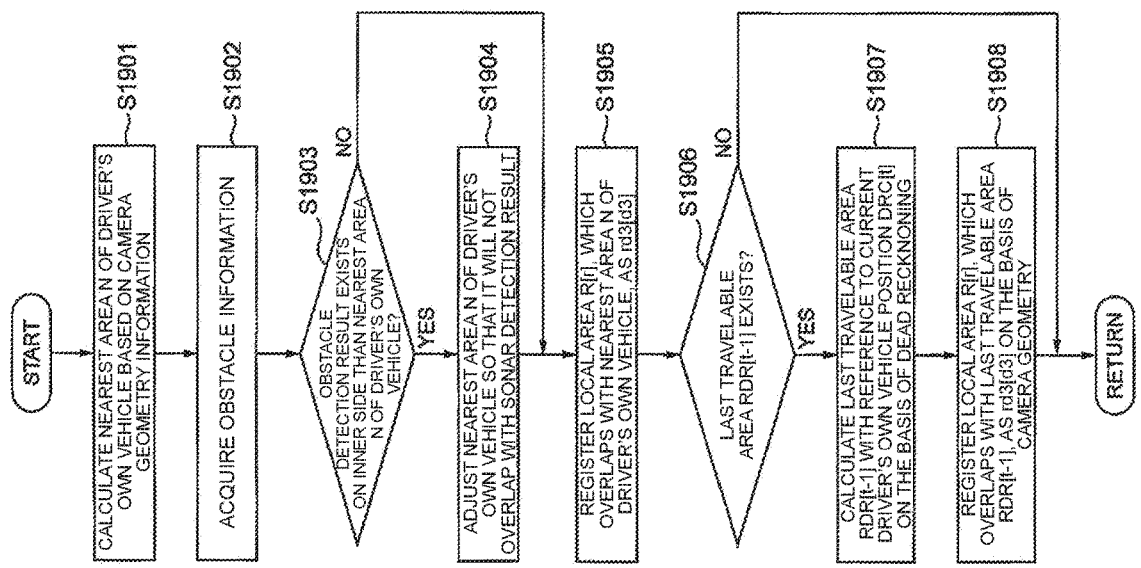
FIG. 19 is a flowchart illustrating processing by a third road surface area extraction unit according to the second embodiment of the present invention.

FIG. 19 is a flowchart illustrating a flow of the processing by the third road surface area extraction unit 2091. Furthermore, FIG. 20 is an explanatory diagram of the processing by the third road surface area extraction unit 2091.

Firstly, in step S1901, the third road surface area extraction unit 2091 sets a specified area in the vicinity of the driver's own vehicle as a nearest area (third road surface area) N of the driver's own vehicle. In this embodiment where the nearest area N is set by using the camera geometry information, the nearest area N is an area of 1 m from the front end of the body of the driver's own vehicle in the traveling direction and 1 m on the right and left sides of the body of the driver's own vehicle.

Next, in step S1902, the third road surface area extraction unit 2091 acquires the distance information of an obstacle(s) around the driver's own vehicle (obstacle information) (the obstacle information acquisition unit). Under this circumstance, the distance information may be the distance information detected by the feature point distance measurement unit 1021 in the past or may be acquired from a sonar(s) mounted in the driver's own vehicle. In this embodiment, the obstacle information OBS detected from the sonar is acquired through a network in the vehicle.

Then, in step S1903, the third road surface area extraction unit 2091 judges whether or not the obstacle detection result exists in an area inner than the nearest area N of the driver's own vehicle. If the obstacle detection result exists, the processing proceeds to step S1904 and the third road surface area extraction unit 2091 adjusts the nearest area N of the driver's own vehicle so that the nearest area N does not overlap with the obstacle information. Under this circumstance, the third road surface area extraction unit 2091 avoids treating the vicinity of the area where the obstacle exists.

Then, in step S1905, the third road surface area extraction unit 2091 transforms the nearest area N of the driver's own vehicle to the coordinate system of the camera image IMGSRC by using the camera geometry information and registers an overlapping area with the local area R[r] to the third road surface area ID group rd3[d3].

Subsequently, in step S1906, the third road surface area extraction unit 2091 acquires whether the last travelable area RDR[t−1] exists or not. If the last travelable area RDR[t−1] exists, the third road surface area extraction unit 2091 executes the processing in step S1907 and subsequent steps; and if the last travelable area RDR[t−1] does not exist, the third road surface area extraction unit 2091 terminates the processing.

In step S1907, the third road surface area extraction unit 2091 acquires the dead reckoning information and calculates the last travelable area RDR[t−1] based on the current driver's own vehicle position DRC[t]. Next, in step S1908, the third road surface area extraction unit 2091 registers the local area R[r] which overlaps with the last travelable area RDR[t−1] to the third road surface area ID group rd3[d3] on the basis of the camera geometry information.

FIG. 20A is an example of the nearest area N of the driver's own vehicle in step S1901. FIG. 20B is an example where the vicinity area N of the driver's own vehicle is directly superimposed in step S1905. FIG. 20B is a captured image of an area in front of the driver's own vehicle 10 and the vicinity area N is indicated in gray and an obstacle Ob is captured ahead.

FIG. 20C is an example where the nearest area N is adjusted in step S1904. In this embodiment, sonars are mounted at four positions at the front of the driver's own vehicle and the obstacle information OBS obtained from the respective sonars is defined as OBS1, OBS2, OBS3, and OBS4, respectively. Furthermore, the vicinity area of the driver's own vehicle is divided in the crosswise direction into for areas (N1, N2, N3, N4) based on the positions where the sonars are mounted. Then, the third road surface area extraction unit 2091 acquires the obstacle information OBS1, OBS2, OBS3, OBS4; and if each object information overlaps with the corresponding vicinity area N1, N2, N3, N4 of the driver's own vehicle, the third road surface area extraction unit 2091 adjusts the depth direction so that no object information overlaps with the vicinity area N1, N2, N3, N4 of the driver's own vehicle. FIG. 20D is an example of the processing in step S1905 where the local area R[r] overlapping with the nearest area N which was adjusted in step S1904 is superimposed by using the camera geometry information.

FIG. 20E is an example of the processing in step S1907 and illustrates the current driver's own vehicle position DRC[t], the last driver's own vehicle position DRC[t−1], and the last travelable area RDR[t−1]. Referring to FIG. 20E, the current driver's own vehicle position is indicated with a solid line 201, the last driver's own vehicle position is indicated with a dotted line 202, and the last travelable area RDR[t−1] is indicated as an area 203. FIG. 20F is an example of the processing in step S1908 where the local area R[r] which overlaps with the last travelable area RDR[t−1] calculated in step S1907 is superimposed by using the camera geometry information.

Incidentally, in this embodiment, all three types of means, that is, a means of using a specified area based on the camera geometry information, a means of adjusting the specified area based on the obstacle information, and a means of using the past road surface area recognition results have been explained together as the method for extracting the third road surface area as illustrated in FIG. 19; however, not all the means may have to be used. For example, regarding only steps S1901 and S1905, only the means of using the specified area based on the camera geometry information is used. Furthermore, if only steps S1901 to S1905 are used, only the means of using the specified area based on the camera geometry information and the means of adjusting the specified area based on the obstacle information are used. Furthermore, if only steps S1906 to S1908 are used, only the means of using the past road surface area recognition results is used.

As the third road surface area extraction unit 2091 is included as explained above, the road surface area which is required for the processing by the second road surface area extraction unit 1071 can be extracted even when the first road surface area extraction unit 1041 has failed to extract the feature points from the road surface area.

The present invention is not limited to each of the aforementioned embodiments and various changes can be made without departing from the gist of the present invention.

The embodiments of the present invention have been described above; however, the present invention is not limited to the above-described embodiments and various design changes can be made without departing from the spirit of the present invention described in the claims. For example, the aforementioned embodiments have been described in detail in order to explain the present invention in an easily comprehensible manner and are not necessarily limited to those having all the configurations explained above. Furthermore, part of the configuration of a certain embodiment can be replaced with the configuration of another embodiment and the configuration of another embodiment can be added to the configuration of a certain embodiment. Also, regarding part of the configuration of each embodiment, the configuration of another configuration can be added to, deleted from, or replaced with the above-mentioned part of the configuration.

REFERENCE SIGNS LIST

1000: on-vehicle external recognition apparatus
1001, 1002, 1003, 1004: cameras
1011: image acquisition unit
1021: feature point distance measurement unit
1031: area division unit
1041: first road surface area extraction unit
1051: obstacle area extraction unit
1061: image feature amount calculation unit
1071: second road surface area extraction unit
1081: separation degree diagnosis unit
1101: travelable area recognition unit
2000: on-vehicle external recognition apparatus
2091: third road surface area extraction unit

What is claimed is:

1. An on-vehicle external recognition apparatus for recognizing a travelable area around a drier's own vehicle, the on-vehicle external recognition apparatus comprising:
an image acquisition unit that acquires an image including an environment around the driver's own vehicle;
a feature point distance measurement unit that extracts a feature point from the image and measures a distance from the driver's own vehicle to the feature point on the basis of a movement of the feature point in the image as obtained by time-series tracking of the feature point;
a first road surface area extraction unit that extracts, as a first road surface area, a local area which is judged as a road surface on the basis of distance information to the feature point and a position of the feature point in the image from among a plurality of local areas which are set in the image;
an image feature amount calculation unit that calculates a multi-dimensional image feature amount including color information for each of the plurality of local areas in the image;
a second road surface area extraction unit that calculates similarity to the first road surface area by using the image feature amount with respect to at least one or more no-road-surface-extracted areas, which have not been extracted as the first road surface area by the first road surface area extraction unit, from among the plurality of local areas in the image and extracts a second road surface area from the at least one or more no-road-surface-extracted areas on the basis of the calculated similarity;
a travelable area recognition unit that recognizes the travelable area by using the first road surface area and the second road surface area; and
an obstacle area extraction unit that extracts, as an obstacle area, a local area which is judges as an obstacle, from among the plurality of local areas which are set in the image, on the basis of the distance information to the feature point and the position of the feature point in the image,
wherein the second road surface area extraction unit:
calculates similarity to the first road surface area and the obstacle area by using the image feature amount with respect to at least one no-road-surface-extracted area which has not been extracted as the first road surface area by the first road surface area extraction unit and at least one no-obstacle-extracted area which has not been extracted as the obstacle area by the obstacle area extraction unit, from among the plurality of local areas in the image; and
extracts the second road surface area from the no-road-surface-extracted area and the no-obstacle-extracted area on the basis of the calculated similarity.

2. The on-vehicle external recognition apparatus according to claim 1, further comprising a separation degree diagnosis unit that calculates a degree of separation between the first road surface area and the obstacle area on the basis of the image feature amount of the first road surface area and the image feature amount of the obstacle area,
wherein the second road surface area extraction unit does not output an extraction result of the second road surface area when the degree of separation is lower than a specified value.

3. The on-vehicle external recognition apparatus according to claim 1, wherein the travelable area recognition unit determines a final road surface area by using the first road surface area and the second road surface area and recognizes the travelable area from the final road surface area on the basis of at least one of camera geometry information and time series processing using past detection results.

4. The on-vehicle external recognition apparatus according to claim 1, wherein when the first road surface area overlaps with the obstacle area, the second road surface area extraction unit deletes the relevant overlapping area from the first road surface area and the obstacle area and recognizes the areas obtained by the deletion as the no-road-surface-extracted area and the no-obstacle-extracted area.

5. The on-vehicle external recognition apparatus according to claim 4, wherein the second road surface area extraction unit finds a grounding position of the feature point in the image by using the distance information to the feature point and the camera geometry information which are used by the obstacle area extraction unit to set the obstacle area; and
if the grounding position overlaps with the first road surface area, the second road surface area extraction unit deletes the relevant overlapping area from the first road surface area and recognizes the area obtained by the deletion as the no-road-surface-extracted area.

6. The on-vehicle external recognition apparatus according to claim 1, further comprising a third road surface area extraction unit that extracts a road surface area by a method different from that of the first road surface area extraction unit and recognizes the estimated road surface area as a third road surface area,
wherein the second road surface area extraction unit extracts the second road surface area, with respect to an area or areas which have not been extracted as the first road surface area or the third road surface area from among the plurality of local areas, on the basis of similarity between the first road surface area, the third road surface area, and the first road surface area, and the obstacle area.

7. The on-vehicle external recognition apparatus according to claim 6, wherein the third road surface area extraction unit sets a specified area in the vicinity of the driver's own vehicle as the third road surface area by using camera geometry information.

8. The on-vehicle external recognition apparatus according to claim 7, further comprising an obstacle information acquisition unit that detects an obstacle around the drier's own vehicle and acquires distance information of the obstacle,
wherein the third road surface area extraction unit adjusts the third road surface area on the basis of the distance information of the obstacle.

9. The on-vehicle external recognition apparatus according to claim 6, wherein the third road surface area extraction unit extracts the third road surface area with reference to a past road surface area detection result.

* * * * *